US007926082B2

(12) United States Patent
Takatori

(10) Patent No.: US 7,926,082 B2
(45) Date of Patent: Apr. 12, 2011

(54) TELEVISION RECEIVER AND METHOD FOR COUNTING THE NUMBER OF ACCESSES FROM THE RECEIVER

(75) Inventor: Masahiro Takatori, Toyonaka (JP)

(73) Assignee: Panasonic Corporation, Osaka (JP)

( * ) Notice: Subject to any disclaimer, the term of this patent is extended or adjusted under 35 U.S.C. 154(b) by 1315 days.

(21) Appl. No.: 10/433,431

(22) PCT Filed: Oct. 22, 2002

(86) PCT No.: PCT/JP02/10908
§ 371 (c)(1),
(2), (4) Date: Jun. 4, 2003

(87) PCT Pub. No.: WO03/036946
PCT Pub. Date: May 1, 2003

(65) Prior Publication Data
US 2004/0021793 A1 Feb. 5, 2004

(30) Foreign Application Priority Data
Oct. 23, 2001 (JP) .................................. 2001-324715

(51) Int. Cl.
*H04N 7/173* (2011.01)
*H04N 5/445* (2011.01)
*G06F 17/00* (2006.01)
*G06F 13/00* (2006.01)

(52) U.S. Cl. ............. 725/112; 725/51; 725/46; 725/34; 725/134; 725/136; 725/109; 725/40; 725/44; 715/206; 715/207

(58) Field of Classification Search .................. 725/109, 725/110, 112, 113, 136, 9–21, 46, 51, 34, 725/134, 142, 40, 44; 706/206, 207
See application file for complete search history.

(56) References Cited

U.S. PATENT DOCUMENTS
5,987,509 A * 11/1999 Portuesi ........................ 725/113
(Continued)

FOREIGN PATENT DOCUMENTS
JP 2001-231020 8/2001
(Continued)

OTHER PUBLICATIONS
Supplementary European Search Report issued Feb. 20, 2009 in corresponding European application No. 02802048.5.
(Continued)

Primary Examiner — Brian T Pendleton
Assistant Examiner — Pinkal R Chokshi
(74) Attorney, Agent, or Firm — Wenderoth, Lind & Ponack, L.L.P.

(57) ABSTRACT

A name and a URL of a specific link destination are stored in a specific link destination information storing section. A microcomputer changes a process to be performed on a link destination depending on whether or not a link destination targeted for the process is a specific link destination. The specific link destination is highlighted when displaying link destinations as icons, and the specific link destination is displayed first when displaying a list of the link destinations. An access history about the specific link destination is stored in an access history storing section. An information server collects the access history from a television receiver and counts the number of accesses to the specific link destination. When the advertisement site is selected as the specific link destination, the number of accesses to the specific link destination is used as an index for indicating an advertising effect.

12 Claims, 12 Drawing Sheets

U.S. PATENT DOCUMENTS

| | | | | |
|---|---|---|---|---|
| 6,061,719 | A * | 5/2000 | Bendinelli et al. | 709/218 |
| 6,072,483 | A | 6/2000 | Rosin et al. | |
| 6,256,785 | B1 * | 7/2001 | Klappert et al. | 725/136 |
| 6,326,982 | B1 * | 12/2001 | Wu et al. | 715/718 |
| 6,401,075 | B1 * | 6/2002 | Mason et al. | 705/14 |
| 6,430,743 | B1 * | 8/2002 | Matsuura | 725/112 |
| 6,460,180 | B1 * | 10/2002 | Park et al. | 725/40 |
| 6,502,243 | B1 * | 12/2002 | Thomas | 725/110 |
| 6,560,777 | B2 * | 5/2003 | Blackketter et al. | 725/110 |
| 6,785,716 | B1 * | 8/2004 | Nobakht | 709/219 |
| 6,806,887 | B2 * | 10/2004 | Chernock et al. | 345/629 |
| 6,832,388 | B1 * | 12/2004 | Du Val | 725/110 |
| 6,928,652 | B1 * | 8/2005 | Goldman | 725/37 |
| 7,120,924 | B1 * | 10/2006 | Katcher et al. | 725/60 |
| 7,337,457 | B2 * | 2/2008 | Pack et al. | 725/40 |
| 2001/0007097 | A1 * | 7/2001 | Kim | 705/14 |
| 2002/0026352 | A1 * | 2/2002 | Murata | 705/14 |
| 2002/0038457 | A1 * | 3/2002 | Numata et al. | 725/47 |
| 2002/0078453 | A1 * | 6/2002 | Kuo | 725/46 |
| 2002/0124074 | A1 * | 9/2002 | Levy et al. | 709/224 |
| 2002/0152090 | A1 * | 10/2002 | Kobayashi et al. | 705/1 |
| 2004/0148281 | A1 * | 7/2004 | Bates et al. | 707/3 |
| 2009/0320071 | A1 * | 12/2009 | Knudson et al. | 725/45 |

FOREIGN PATENT DOCUMENTS

| | | |
|---|---|---|
| JP | 2001-251564 | 9/2001 |
| JP | 2001-285743 | 10/2001 |
| JP | 2001-285831 | 10/2001 |
| WO | WO 9817064 A1 * | 4/1998 |
| WO | WO 9853611 A1 * | 11/1998 |
| WO | 00/64172 | 10/2000 |
| WO | 01/65832 | 9/2001 |

OTHER PUBLICATIONS

European Office Action issued Sep. 29, 2010 in corresponding European Application No. 02 802 048.5.

* cited by examiner

FIG. 7
(a) 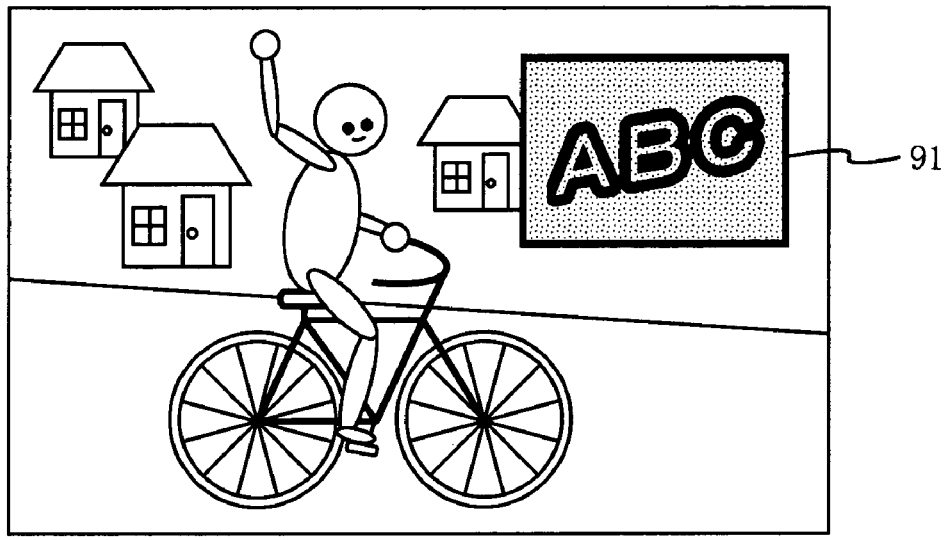
(b) 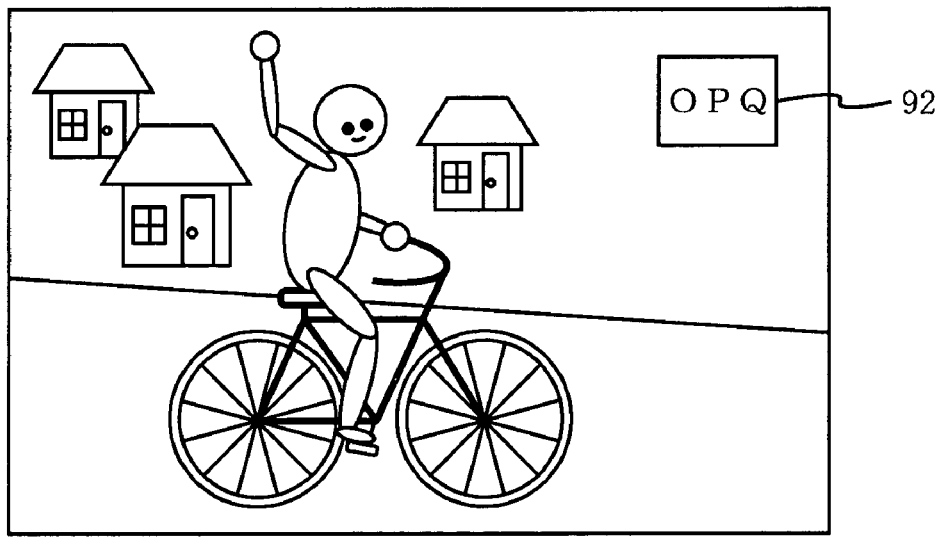

32

| NAME | LINK DESTINATION URL | NO. OF ACCESSES |
|---|---|---|
| 81 | 82 | 83 |
| A B C | http://www.ABC.co.jp/ | 0 |
| X Y Z | http://www.XYZ.or.jp/ | 5 |
| S T U | http://111.222.33.44/ | 20 |
| — | — | — |
| — | — | — |
| — | — | — |

TELEVISION RECEIVER AND METHOD FOR COUNTING THE NUMBER OF ACCESSES FROM THE RECEIVER

CROSS-REFERENCE TO RELATED APPLICATIONS

This application is the National Stage of International Application No. PCT/JP02/10908, filed on Oct. 22, 2002.

BACKGROUND OF THE INVENTION

1. Field of the Invention

The present invention relates to a television receiver, and a method for counting the number of accesses therefrom. Examples of apparatuses for which the present invention is intended include various types of equipment having a television receiving function, such as general types of television receivers, personal computers, mobile phones, personal digital assistants, etc.

2. Description of the Related Art

In digital television broadcasting, various types of data are contained in a television signal together with video and audio information when transmitted. FIG. 12 is a block diagram illustrating the configuration of a conventional television receiver. A conventional television receiver 110 receives a television signal from a television broadcasting system 141 using an antenna 11 and obtains video and audio from the received television signal using a tuner 12, a transport stream decoder 13 (hereinafter, referred to as the "TS decoder"), a buffer memory 14, and an audio/video decoder 15 (hereinafter, referred to as the "AV decoder"). An OSD (On Screen Display) controller 16 creates bitmap data containing characters, graphics, etc. Video output by the AV decoder 15 and characters, graphics, and the like output by the OSD controller 16 are displayed on a monitor 17. A remote control 21 and a light receiving section 22 function together as input means for inputting an instruction from the user, and a modem functions as communication means for connections to a communication line 1. The television receiver 110 is connected to an information server 142 via the communication line 1 and the internet 2.

A microcomputer 120 (hereinafter, referred to as the "micom") controls each component of the television receiver 110 and performs a process for receiving bookmark data and accessing a link destination, as described below. The television receiver 110 receives a television signal containing the bookmark data from the television broadcasting system 141. The bookmark data contains attribute information for accessing information associated with a program, an advertisement, or the like, which is being broadcast (e.g., link destination names and link destination URLs (Uniform Resource Locators); hereinafter, referred to as the "link destination information"). When the television receiver 110 receives the bookmark data, the micom 120 causes an icon indicating the reception of the bookmark data to be displayed on the monitor 17. The user recognizes the displayed icon and instructs the television receiver 110 to store the received bookmark data as necessary. After having viewed the program, the advertisement, or the like, the user further instructs the television receiver 110 to access the link destination using the link destination information contained in the stored bookmark data. The micom 120 performs processing in accordance with these instructions from the user, so that, after having viewed the program, the advertisement, or the like, the user can acquire various types of information from a desired link destination based on the bookmark data transmitted during the broadcast of the program, advertisement, or the like.

Operations of the television receiver 110 are described with reference to FIGS. 13 and 14. The television receiver 110 performs a process illustrated in FIG. 13 for receiving the bookmark data and a process illustrated in FIG. 14 for accessing the link destination. When the television receiver 110 receives bookmark data (step S111 of FIG. 13), the micom 120 analyzes the received bookmark data and extracts link destination names and link destination URLs (step S112). Next, the micom 120 controls the OSD controller 16 so as to cause an icon indicating the reception of the bookmark data to be displayed on the monitor 17 (step S113). The user recognizes the displayed icon and, for example, presses a button on the remote control 21 to instruct the television receiver 110 to store the bookmark data. The micom 120 determines whether or not storing of the bookmark data has been instructed (step S114). When instructed, the bookmark data received at step S111 is written in a bookmark data storing section 24 (step S115). In this manner, the television receiver 110 stores the received bookmark data.

After having viewed a program, an advertisement, or the like, the user uses the remote control 21 or the like to instruct the television receiver 110 to display the bookmark data in the form of a list. When the instruction to display the list is received (step S121 of FIG. 14), the micom 120 extracts names of link destinations and link destination URLs from the bookmark data stored in the bookmark data storing section 24 (step S122) and controls the OSD controller 16 so as to cause a list of link destinations to be displayed on the monitor 17 in the order the link destinations are read from the bookmark data storing section 24 (step S123). The user recognizes the displayed list and uses the remote control 21 or the like to designate a link destination to be accessed. When the micom 120 receives the link destination designation (step S124), the micom 120 controls the modem 23 so as to access the designated link destination and acquires information from the information server 142. The acquired information is displayed on the monitor 17 in accordance with control of the micom 120 (step S125).

In addition to the above-described technology related to the television receiver, as a method for counting the number of accesses in the case where terminal apparatuses connected to the internet access a link destination, the following method is known. FIG. 15 illustrates a conventional method for counting the number of accesses. In this method, the information server 142 provides a portal site 153 and obtains the number of accesses in the case where the link destination is accessed via the portal site 153. The information server 142 includes a site database 151 having site management information stored therein and an access history database 152 having an access history about the link destination stored therein. Advertisement sites 143a and 143b provide advertisement information. The advertisement sites 143a and 143b are linked to the portal site 153. A terminal apparatus 100 temporarily accesses the portal site 153 and follows the link to access the advertisement sites 143a and 143b. In FIG. 15, two arrows denoted by reference numeral P112 respectively represent accesses to the portal site 153 and the advertisement site 143b.

For example, in the case of counting the number of accesses to the advertisement site 143b, a sponsor system 144 instructs the information server 142 to do the counting (P111 of FIG. 15). The information server 142 writes to the site database 151 information that the advertisement site 143b is the link destination an access history of which should be obtained. When the terminal apparatus 100 accesses the advertisement site 143b via the portal site 153, the information server 142 updates the access history database 152 (P112). After a lapse of a prescribed time period, the information server 142 counts the number of accesses to the advertisement site 143b based on the access history stored in the access history database 152 and transmits the counted number to the sponsor system 144 (P113). In this manner, the sponsor system 144 is provided with the number of accesses in the case where the advertisement site 143 is accessed via the portal site.

However, the above-described conventional television receiver does not have a function of distinguishing link destinations. Accordingly, the conventional television receiver cannot present a specific link destination (for example, an advertisement site of a specific sponsor) to a user in a highlighted manner nor distinguish the specific link destination to obtain an access history thereof.

When requested by a sponsor, a portal site operator company or an advertisement agent company publishes advertisement information in a portal site or transmits bookmark data which contains link destination information of an advertisement site and is contained in a television signal. For the purpose of showing the sponsor that its own activities have contributed to an increase in effect of the advertisement, such a company wants to count the number of accesses to the advertisement site using the link destination information contained in the bookmark data. In the conventional method for counting the number of accesses, however, whether or not the accesses to the link destination are provided based on the bookmark data is not determined. Therefore, the portal site operator company or advertisement agent company cannot count the number of accesses in the case where the link destination is accessed based on the bookmark data, failing to effectively show the effectiveness of its own activities to the sponsor.

Therefore, an object of the present invention is to provide a television receiver and a method for counting the number of accesses therefrom which solve the above-described problems.

BRIEF SUMMARY OF THE INVENTION

To achieve the above object, the present invention has the following aspects.

A first aspect of the present invention is directed to a television receiver having a television broadcast receiving function and an information acquisition function. The receiver includes: a television broadcast receiving section for outputting video and audio information based on a received television signal; a link destination information extracting section for extracting attribute information of an accessible link destination from the television signal; an information acquisition section for acquiring information from a link destination designated by a user by using the attribute information extracted by the link destination information extracting section; an identification information storing section for storing identification information for identifying whether or not the link destination is a specific link destination; and a control section for determining whether or not the link destination targeted for a process is the specific link destination by using the attribute information extracted by the link destination information extracting section and the identification information stored in the identification information storing section and for changing the process to be performed on the link destination based on the determination.

According to the above-described first aspect, the television receiver determines whether or not the link destination is the specific link destination by using the identification information, and changes the process to be performed on the link destination based on the determination. Thus, it is possible to highlight the specific link destination when displaying link destinations as icons and to display the specific link destination first when the link destinations are displayed as a list. Since the specific link destination can be distinguished to obtain an access history thereof, the number of accesses to the specific link destination can be counted. As the specific link destination as described above, for example, an advertisement site of a specific sponsor or the like is selected.

In a second aspect based on the first aspect, the television receiver further comprises a presenting section for presenting the accessible link destination by using the attribute information extracted by the link destination extracting section. The presenting section changes a presented form of the accessible link destination based on the determination by the control means.

According to the above-described second aspect, the television receiver changes the presented form of the link destination depending on whether or not the link destination is the specific link destination. Accordingly, it is possible to highlight or preferentially display the specific link destination when presenting link destinations. Thus, it is possible to increase the number of accesses to the specific link destination. When an advertisement site is selected as the specific link destination, it is possible to increase the number of accesses to the advertisement site to enhance an advertising effect.

In a third aspect based on the second aspect, in the case of displaying the accessible link destination using an icon, the presenting section changes a displayed form of the icon based on the determination by the control means.

According to the above-described third aspect, the television receiver highlights the specific link destination when displaying link destinations as icons, and therefore it is possible to increase the number of accesses to the specific link destination.

In a fourth aspect based on the second aspect, in the case of displaying a list of accessible link destinations, the presenting section changes a displayed form for each link destination based on the determination by the control means.

According to the above-described fourth aspect, the television receiver displays the specific link destination first or highlights the specific link destination when displaying the link destinations as a list. Therefore, it is possible to increase the number of accesses to the specific link destination.

In a fifth aspect based on the first aspect, the television receiver further comprises a communication section for communicating with an information server connected thereto via a communication line. The information acquisition section acquires acquiring information from the information server using the communication section.

According to the above-described fifth aspect, the television receiver acquires information designated by the user from the server connected thereto via the communication line. In this manner, the television receiver can acquire information by using a means, which is different from television broadcasting, and provide the information to the user.

In a sixth aspect based on the fifth aspect, the television receiver further comprises an access history storing section for storing an access history about the link destination. The control section updates the access history when the information acquisition section accesses the specific link destination and transmits the access history at a prescribed time by using the communication section.

According to the above-described sixth aspect, the television receiver obtains the access history about the specific link destination and suitably transmits the obtained access history. By receiving and summarizing access histories transmitted by television receivers, it is possible to obtain various statistics with respect to accesses to the specific link destination. For example, when a link destination provided by a bookmark service of the digital broadcasting is selected as the specific link destination, it is possible to obtain the number of accesses in the case where the link destination is accessed via the bookmark service. The number of accesses obtained in this manner is used as an index for quantitatively indicating the effectiveness of the bookmark service.

In a seventh aspect based on the sixth aspect, the control section receives the identification information from the information server by using the communication means and writes the received identification information to the identification information storing section.

According to the above-described seventh aspect, the television receiver receives the identification information from the information server connected thereto via the communication line, and determines whether or not the link destination is the specific link destination by using the received identification information. Therefore, it is possible to suitably change the identification information during the operation of the television receiver to freely obtain an access history about any link destination.

In an eighth aspect based on the first aspect, the control section extracts the identification information from television receiver maintenance data, which is included in the television signal, and writes the extracted identification information to the identification information storing section.

According to the above-described eighth aspect, the television receiver extracts the identification information from the maintenance data included in the television signal and determines whether or not the link destination is the specific link destination by using the extracted identification information. Therefore, it is possible to suitably change the identification information during the operation of the television receiver to freely obtain an access history about any link destination. Since the identification information is included in and transmitted with the television signal, the television receiver is not required to perform communication for receiving the identification information.

In a ninth aspect based on the first aspect, the link destination information extracting section extracts at least address information of the link destination as the attribute information. The identification information storing section stores at least address information of the specific link destination as the identification information. The control section determines whether or not the link destination is the specific link destination by determining whether or not the attribute information extracted by the link destination information extracting section is stored in the identification information storing section.

According to the above-described ninth aspect, the television receiver determines whether or not the link destination is the specific link destination based on the address information of the link destination.

In a tenth aspect based on the first aspect, the link destination information extracting section extracts at least a name and an address information of the link destination as the attribute information. The identification information storing section stores at least a name and an address information of the specific link destination as the identification information. The control section determines whether or not the link destination is the specific link destination by determining whether or not the attribute information extracted by the link destination information extracting section is stored in the identification information storing section.

According to the above-described tenth aspect, the television receiver determines whether or not the link destination is the specific link destination based on the name and the address information of the link destination. Thus, it is possible to increase the reliability of the determination as to whether or not the link destination is the specific link destination.

In an eleventh aspect based on the first aspect, the link destination information extracting section extracts at least the name, the address information, and manager information of the link destination as the attribute information. The identification information storing section stores at least the name, the address information, and manager information of the specific link destination as the identification information. The control section determines whether or not the link destination is the specific link destination by determining whether or not the attribute information extracted by the link destination information extracting section is stored in the identification information storing section.

According to the above-described eleventh aspect, the television receiver determines whether or not the link destination is the specific link destination based on the name, the address information, and the manager information of the link destination. By using the manager information for determining whether or not the link destination is the specific link destination, it is possible to confirm that received link destination information is associated with a specific company.

A twelfth aspect of the present invention is directed to a method for counting the number of accesses when a plurality of television receivers access a specific link destination, the method being performed in the case where each of the television receivers comprises: a communication section; a television broadcast receiving section for outputting video and audio based on a received television signal; a link destination information extracting section for extracting attribute information of an accessible link destination from the television signal; an information acquisition section for acquiring information from a link destination designated by a user by using the attribute information extracted by the link destination information extracting section; an identification information storing section for storing identification information for identifying whether or not the link destination is a specific link destination; an access history storing section for storing an access history about the link destination; and a control section for performing a process for determining whether or not a link destination targeted for the process is the specific link destination by using the attribute information extracted by the link destination information extracting section and the identification information stored in the identification information storing section, and a process for updating the access history when the information acquisition section accesses the specific link destination and transmitting the access history at a prescribed time by using the communication section, and the method comprising the steps of: providing the identification information to each of the television receivers; transmitting a television signal including the attribute information of the link destination accessible from the television receivers by using a television broadcasting system; receiving the access history transmitted by each of the television receivers; and obtaining the number of accesses to the specific link destination based on the access history received from each of the television receivers.

According to the above-described twelfth aspect, the television receiver obtains the access history about the specific link destination and suitably transmits the obtained access history. Accordingly, by receiving and summarizing access histories transmitted by the plurality of television receivers, it is possible to obtain various statistics with respect to accesses to the specific link destination. For example, when a link destination provided by a bookmark service of the digital broadcasting is selected as the specific link destination, it is possible to obtain the number of accesses in the case where the link destination is accessed via the bookmark service. The number of accesses obtained in this manner is used as an index for quantitatively indicating the effectiveness of the bookmark service.

In a thirteenth aspect based on the twelfth aspect, the method further comprises the step of providing the number of accesses obtained to a specific link destination manager system.

According to the above-described thirteenth aspect, the manager of the specific link destination can recognize the number of accesses to the link destination operated by himself/herself. Thus, the specific link destination manager can evaluate the result of transmitting a television signal including attribute information of the link destination operated by himself/herself.

In a fourteenth aspect based on the twelfth aspect, the method further comprises the step of providing the number of accesses obtained to the television broadcasting system.

According to the above-described fourteenth aspect, the result of transmitting the television signal including the attribute information of the link destination can be evaluated in a broadcasting station.

In a fifteenth aspect based on the twelfth aspect, the specific link destination is an advertisement site.

According to the above-described fifteenth aspect, it is possible to obtain various statistics with respect to accesses to an advertisement site. For example, when an advertisement site provided by a bookmark service of the digital broadcasting is selected as the specific link destination, it is possible to obtain the number of accesses in the case where the advertisement site is accessed via the bookmark service. The number of accesses obtained in this manner is used as an index for quantitatively indicating the effectiveness of the bookmark service.

BRIEF DESCRIPTION OF THE DRAWINGS

FIG. 7 is a diagram illustrating displayed screen images in the case where the television receiver according to the first embodiment of the present invention displays link destinations by using icons.

DETAILED DESCRIPTION OF THE INVENTION

First Embodiment

Figure 1:
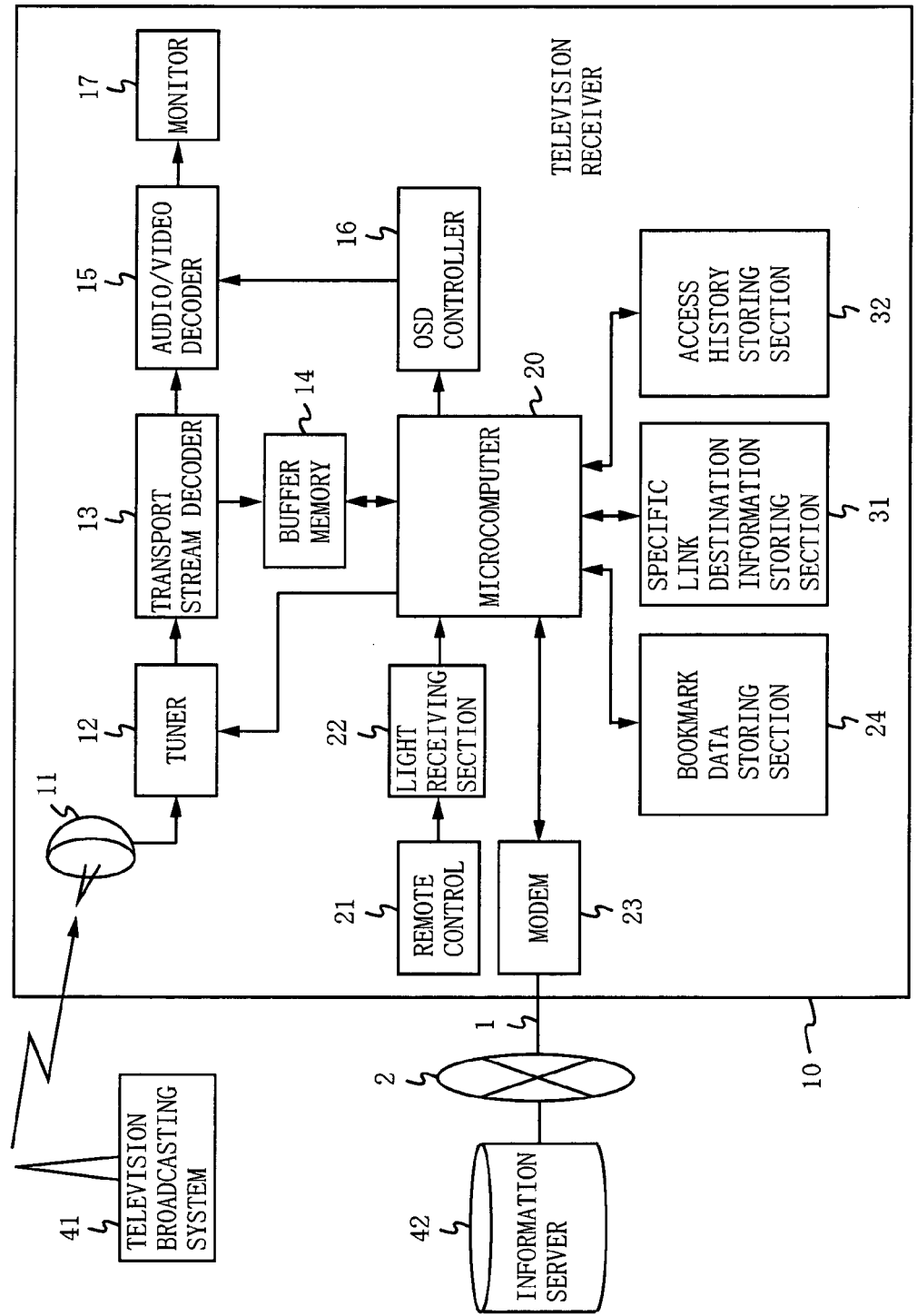
FIG. 1 is a block diagram illustrating the configuration of a television receiver according to a first embodiment of the present invention.

FIG. 1 is a block diagram illustrating the configuration of a television receiver according to a first embodiment of the present invention. In FIG. 1, a television receiver 10 includes an antenna 11, a tuner 12, a transport system (TS) decoder 13, a buffer memory 14, an audio/video (AV) decoder 15, an On Screen Display (OSD) controller 16, a monitor 17, a micom 20, a remote control 21, a light receiving section 22, a modem 23, a bookmark data storing section 24, a specific link destination information storing section 31, and an access history storing section 32.

The television receiver 10 is connected to the internet 2 via a communication line 1 and an access point (not shown). An information server 42 having various information accumulated therein is connected to the internet 2. The television receiver 10 has a function of receiving a television signal transmitted by a television broadcasting system 41 and outputting video and audio (a television broadcast receiving function) and a function of acquiring information from the information server 42 (an information acquisition function). For simplification of the drawing, only one information server 42 is shown in FIG. 1, however, a number of information servers are connected to the actual internet 2.

Components of the television receiver 10 will be described below. The antenna 11 receives a digital television broadcasting wave transmitted by the television broadcasting system 41, converts the received wave into an electric signal, and outputs the resultant signal. The tuner 12 extracts a signal having a frequency selected by the user from the signal output by the antenna and demodulates the extracted signal. Thus, the tuner 12 outputs a transport stream conforming to an MPEG (Moving Picture Experts Group) standard.

The TS decoder 13 performs a filtering process conforming to the MPEG standard on the transport stream output by the tuner 12. More specifically, the TS decoder 13 filters and outputs video and audio streams of a program, an advertisement, or the like, which is selected by the user, packets associated with data broadcasting, download service packets, etc. The download service packets are transmitted using an engineering slot of the digital broadcasting and are used for the purpose of maintenance, such as updating of firmware and data for the television receiver 10. The filtering process by the TS decoder 13 is performed using a program identification data (Program ID) contained in, for example, a PAT (Program Association Table) packet or a PMT (Program Map Table) packet.

The buffer memory 14 stores the packets associated with the data broadcasting and the download service packets which have been filtered by the TS decoder 13. In accordance with control of the micom 20, the buffer memory 14 further stores various information obtained from the information server 42 in the state of being expanded into a prescribed format.

The AV decoder 15 decodes the audio and video streams output by the TS decoder 13 and outputs video and audio. In accordance with control of the micom 20, the OSD controller 16 converts characters and graphics, which are contained in a screen image of the data broadcast or information acquired from the information server 42, into bitmap data and outputs the bitmap data to the AV decoder 15. The AV decoder 15 combines, in accordance with a prescribed method, the characters and graphics output by the OSD controller 16 with video data obtained by itself and outputs the combining result to the monitor 17. Thus, the characters and graphics output by the OSD controller 16 are displayed on the monitor 17 so as to be superimposed on a video image of the television broadcast, or the characters and graphics and the video image are selectively displayed.

The micom 20 controls each component of the television receiver 10 and receives bookmark data to perform a process for accessing the link destination. The details of the operation of the micom 20 will be described later. The remote control 21 is an input device operated by the user of the television receiver 10 and outputs an optical signal (e.g., an infrared signal) in response to the user's operation. The light receiving section 22 receives the optical signal output by the remote control 21, converts the received signal into an electric signal, and outputs the resultant signal to the micom 20.

In accordance with control of the micom 20, the modem 23 has a function of demodulating data received via the communication line 1 and outputting the resultant signal, and a function of modulating data output by the micom 20 and outputting the resultant data over the communication line 1. The modem 23 may be any type of modem, e.g., a general-type modem connected to a telephone line, an ADSL (Asymmetric Data Subscriber Line) modem connected to a telephone line, an FTTH ONU (Fiber To The Home Optical Network Unit) connected to an optical fiber network, a cable modem connected to a cable television line, etc. A connection method of the modem 23 may be a dial-up connection or a constant connection. The modem 23 transmits viewing history information to a viewing information collecting center (not shown) connected to the communication line 1 and receives various information from an information server connected to the Internet 2, a cable television network (not shown), or the like.

Among information (or sites) accessible from the television receiver 10 via communication or broadcasting, information (or a site) which has been previously selected according to a certain method is referred to as the "specific link destination". For example, information accumulated in the information server 42 connected to the internet 2, or an advertisement site operated by a sponsor can be the specific link destination. Link destination information about the specific link destination is referred to as the "specific link destination information". The specific link destination information contains, for example, the name of the specific link destination, the URL of the specific link destination, and information about the manager of the specific link destination.

The micom 20 controls the modem 23 so as to receive the specific link destination information from the information server 42 before receiving television broadcast. In the first embodiment, the specific link destination information is used as identification information for identifying whether or not a link destination is the specific link destination. The specific link destination information storing section 31 functions as identification information storing means and stores the specific link destination information received from the information server 42 in accordance with control of the micom 20. The bookmark data storing section stores bookmark data contained in a television signal transmitted by the television broadcasting system 41 in accordance with control of the micom 20. The access history storing section 32 stores an access history about the link destination in accordance with control of the micom 20. More specifically, in the first embodiment, the access history storing section 32 stores an access history about the specific link destination. The bookmark data storing section 24, the specific link destination information storing section 31, and the access history storing section 32 may be provided in different memories or different regions in the same memory. The details of these three storing sections will be described later.

The micom 20 performs software processing to detect that a program having been viewed is finished or switched to another program by the user's instruction. In digital television broadcasting, information for creating a program list is contained in a television signal when transmitted. Accordingly, the micom 20 refers to a program end time contained in such information to detect that the program having been viewed is finished. The micom 20 interprets all the user's instructions input by, for example, using the remote control 21, and performs processing. Therefore, the micom 20 can detect that the program having been viewed is switched to another program by the user's instruction. In the first embodiment, the micom 20 performs the process for receiving the bookmark data and accessing the link destination, and the process for detecting the end of a program or a switch between programs. However, all or part of these processes may be performed by dedicated hardware other than the micom 20.

Bookmark service by data broadcast will now be described. In the bookmark service, when a program, an advertisement, or the like is broadcast on television, bookmark data including link destination information for accessing detailed information about the program, advertisement, or the like is provided by the data broadcast. When the television receiver 10 receives the bookmark data, the television receiver 10 displays an icon indicating the reception on the monitor 17. The user recognizes the displayed icon and instructs the television receiver 10 to store the received bookmark data by, for example, pressing a button on the remote control 21 as necessary. When the television receiver 10 receives the instruction to store the bookmark data, the television receiver 10 writes the received bookmark data to the bookmark data storing section 24. The bookmark data storing section 24 is typically formed using a nonvolatile memory.

After viewing the program, advertisement, or the like, the user uses, for example, the remote control 21 to instruct the television receiver 10 to access a designated link destination. When the television receiver 10 receives this instruction, the television receiver 10 accesses the designated link destination and acquires various information from the information server 42. The acquired information is displayed on the monitor 17. In this manner, the user can acquire detailed information about the program, advertisement, or the like, from a medium other than the television broadcast after viewing the program, advertisement, or the like. In the digital data broadcasting, standardization of the bookmark service has already been achieved and the operation of the bookmark service is planned to be started in the near future.

Figure 2:
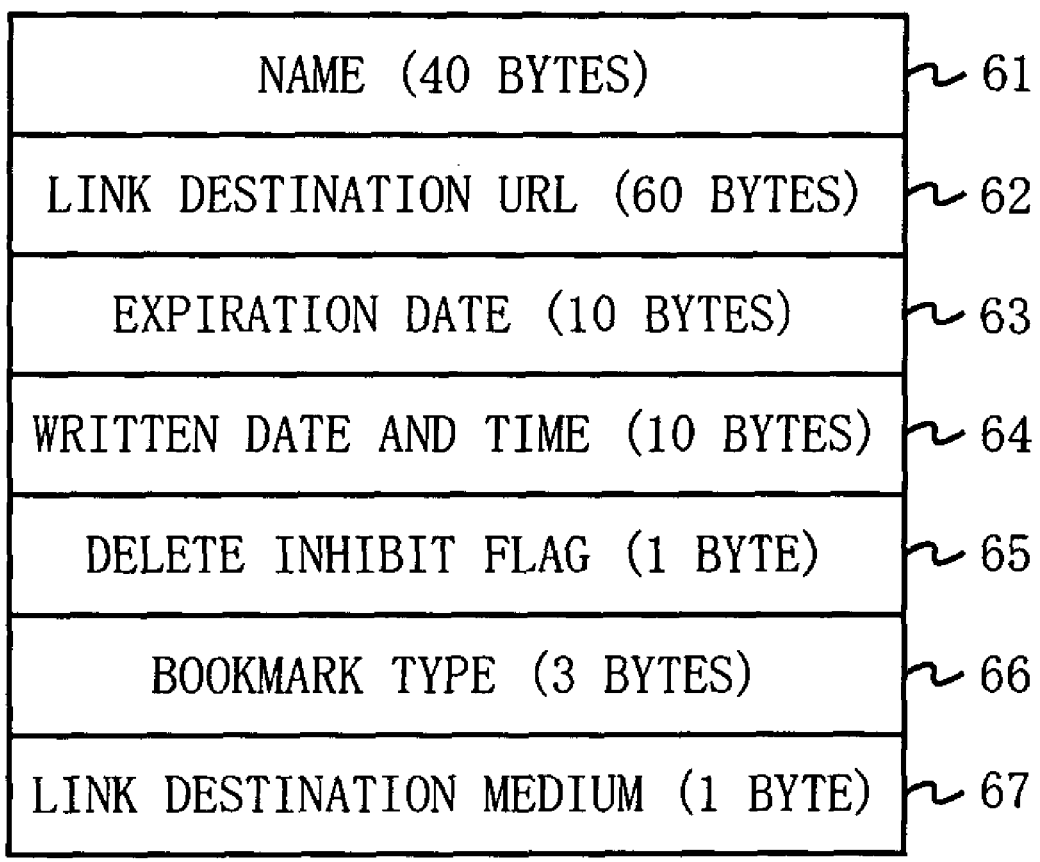
FIG. 2 is a diagram illustrating an example of a data structure of bookmark data stored in the television receiver according to the first embodiment of the present invention.

FIG. 2 is a diagram illustrating an example of a data structure of the bookmark data stored in the bookmark data storing section 24. In FIG. 2, a name 61 is data indicating a name of a link destination and has a data size of up to 40 bytes. A link destination URL 62 is address information of the link destination and has a data size of up to 60 bytes. An expiration date 63 is data indicating the expiration date of stored bookmark data and has a data size of up to 10 bytes. A written date and time 64 is data indicating the date and time at which the television receiver 10 stored the bookmark data therein, and has a data size of up to 10 bytes. A delete inhibit flag 65 is flag information indicating whether or not the bookmark data is allowed to be deleted. A bookmark type 66 is data indicating the type of the bookmark data and has a data size of up to 3 bytes. For the purpose of providing extensibility in data transmission and reception, the bookmark type 66 includes a region where various companies can freely set values (hereinafter, referred to as the "company region"). A link destination medium 67 is data indicating a linked medium and has a data size of up to 3 bytes. The link destination medium 67 is used together with the link destination URL 62 for specifying the link destination.

Figure 3:
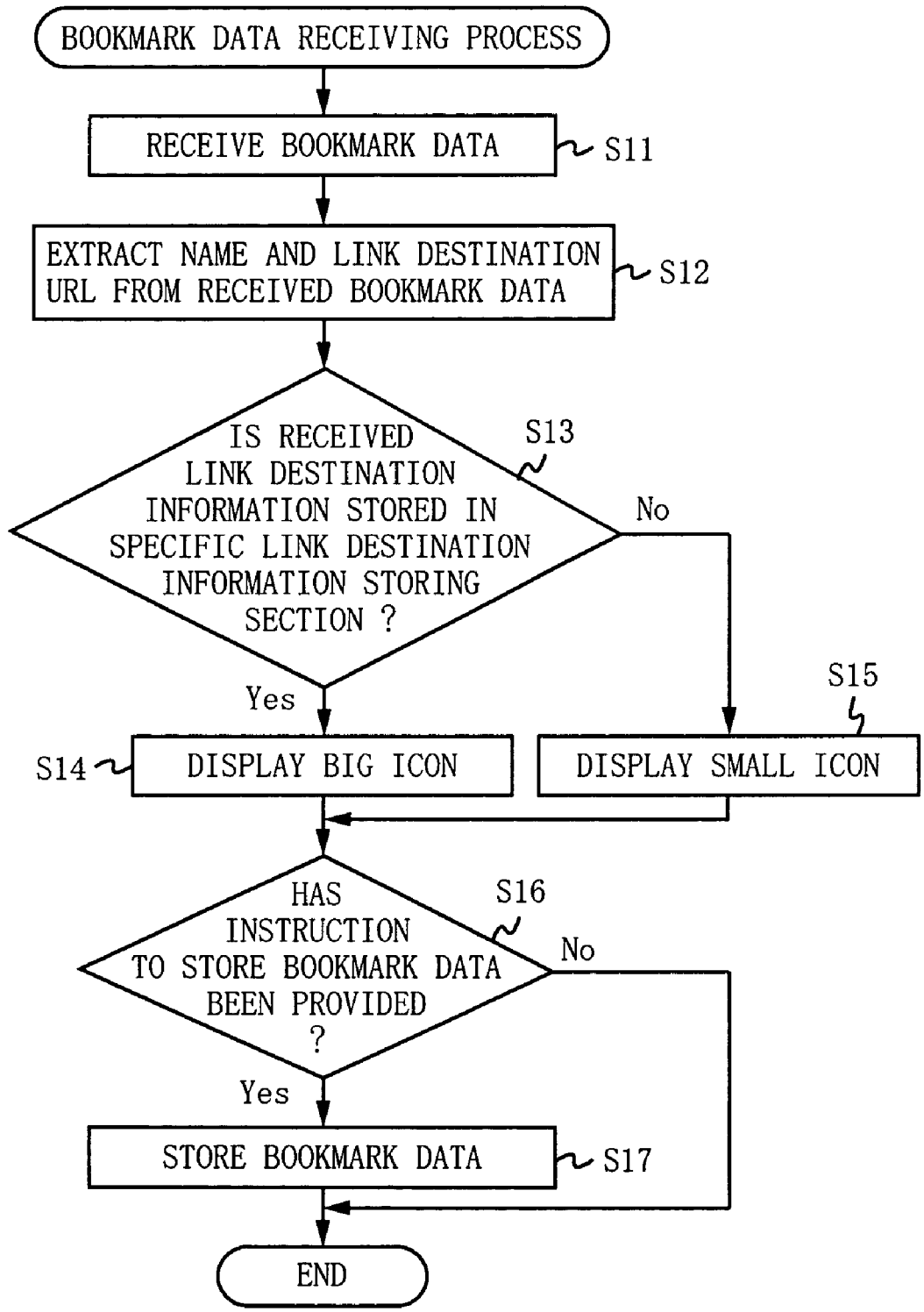
FIG. 3 is a flowchart illustrating a bookmark data receiving process of the television receiver according to the first embodiment of the present invention.
Figure 4:
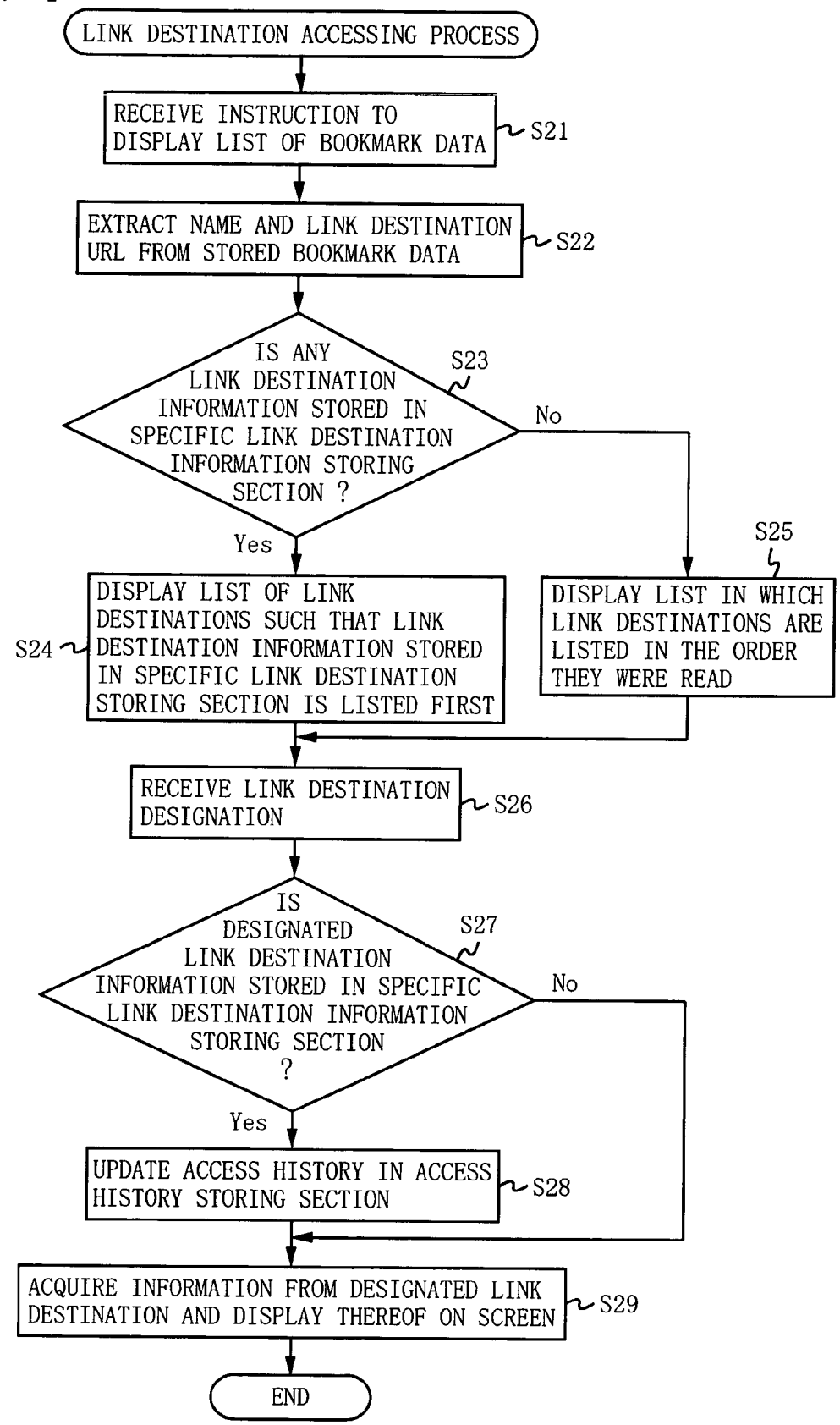
FIG. 4 is a flowchart illustrating a link destination accessing process of the television receiver according to the first embodiment of the present invention.
Figures 5, 6:
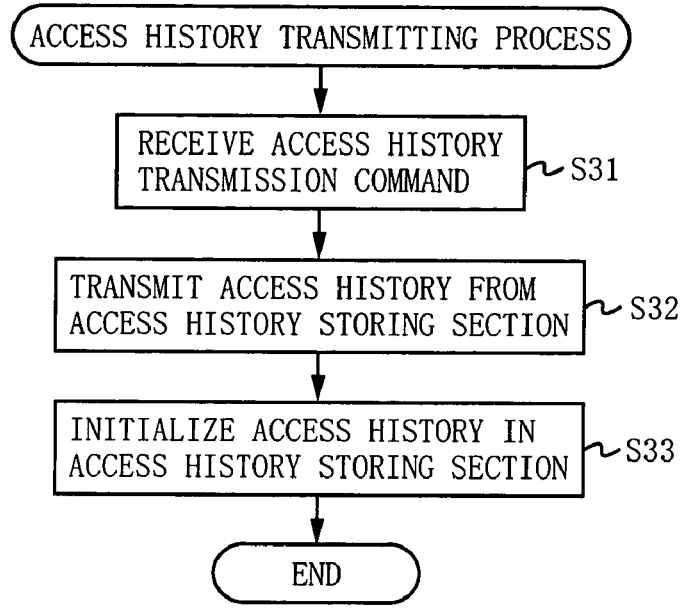
FIG. 5 is a flowchart illustrating an access history transmitting process of the television receiver according to the first embodiment of the present invention.
FIG. 6 is a diagram illustrating how specific link destination information is stored in a specific link destination information storing section of the television receiver according to the first embodiment of the present invention.

Operations of the television receiver 10 will be described in detail with reference to FIGS. 3 to 5. FIGS. 3 to 5 are flowcharts illustrating three types of processes of the television receiver 10. The television receiver 10 performs the process illustrated in FIG. 3 when the bookmark data is received, the process illustrated in FIG. 4 for accessing the link destination, and the process illustrated in FIG. 5 for transmitting an access history. These processes are mostly realized by software processing by the micom 20.

Firstly, the operation of the television receiver 10 is described with respect to the case of receiving the bookmark data (see FIG. 3). The television receiver 10 receives the bookmark data from the television broadcasting system 41 (step S11). More specifically, a television signal transmitted by the television broadcasting system 41 contains the bookmark data which contains link destination information. The TS decoder 13 performs a filtering process on an output signal of the tuner 12 and writes a stream containing the bookmark data to the buffer memory 14. The micom 20 obtains the bookmark data from the stream written in the buffer memory 14. Then, the micom 20 extracts a name and a link destination URL from the bookmark data received at step S11 (step S12).

At this point, names and URLs of specific link destinations have already been stored as the specific link destination information in the specific link destination information storing section 31. As described above, the specific link destination information is used as identification information for identifying whether or not the link destination is a specific link destination. FIG. 6 is a diagram illustrating how the specific link destination information is stored in the specific link destination information storing section. The specific link destination information storing section 31 illustrated in FIG. 6 stores names 71 and link destination URLs 72 of three specific link destinations such that the name and the link destination URL of each specific link destination are associated with each other. Although no data is stored in the fourth and subsequent regions yet, these regions are used for additionally storing specific link destinations later. Note that the specific link destination information is not limited to that illustrated in FIG. 6 and may be any other type of information capable of identifying whether or not the link destination is the specific link destination. For example, the specific link destination information may contain either the name 71 or the link destination URL 72, or may be identical to the bookmark data.

Next, referring back to FIG. 3, the micom 20 refers to the name and the link destination URL which have been extracted in step S12 to check whether or not the received link destination information is stored in the specific link destination information storing section 31 (step S13). For example, the micom 20 reads one name 71 and one link destination URL 72 from the specific link destination information storing section 31 to check whether or not the read name and link destination URL match the name and link destination URL extracted at step S12. In this case, the micom 20 may check whether or not both the name and the link destination URL have their respective matches or may check whether or not either the name or the link destination URL has a match. Alternatively, the micom 20 may perform, an ambiguous matching process, fuzzy inference, or the like, with respect to a character string to check whether or not the name and the link destination URL match with each other based on uniform determination criteria.

In the case where the received link destination information is stored in the specific link destination information storing section 31 (Yes at step S13), the micom 20 determines that the received link destination information corresponds to a specific link destination, and the procedure proceeds to step S14. In such a case, the micom 20 controls the OSD controller 16 so as to create an emphasized big icon image associated with the received link destination information. Consequently, the emphasized big icon is displayed on the monitor 17 so as to be superimposed on a video image of the television broadcast (step S14).

On the other hand, in the case where the received link destination information is not stored in the specific link destination information storing section 31 (No at step S13), the micom 20 determines that the received link destination information does not correspond to a specific link destination, and the procedure proceeds to step S15. In such a case, the micom 20 controls the OSD controller 16 so as to create an unemphasized small icon image associated with the received link destination information. Consequently, the unemphasized small icon is displayed on the monitor 17 so as to be superimposed on the video image of the television broadcast (step S15). In this manner, the television receiver 10 presents icons indicating link destinations to the user in different forms depending on whether or not the received link destination information corresponds to the specific link destination. In this case, by highlighting the specific link destination on the display, it is possible to promote the user's interest in the specific link destination, thereby increasing the number of accesses to the specific link destination.

A method for changing a displayed form of an icon will be described with reference to FIG. 7. FIG. 7 is a diagram illustrating displayed screen images obtained by superimposing icons indicating link destinations on a video image of the television broadcast (a video image in which a person is riding a bicycle). Hereinbelow, a link destination having, for example, a name L is called the "link destination L". In the example illustrated in FIG. 7, it is assumed that link destination ABC is a specific link destination and link destination OPQ is not a specific link destination. The specific link destination information storing section 31 stores link destination information about the link destination ABC but does not store link destination information about the link destination OPQ.

FIG. 7(a) illustrates a displayed screen image in the case where bookmark data including the link destination information about the link destination ABC is received. FIG. 7(b) illustrates a displayed screen image in the case where bookmark data including the link destination information about the link destination OPQ is received. The link destination ABC is the specific link destination, and therefore an icon 91 (FIG. 7(a)) displaying the name of the link destination ABC is emphasized by using a character size and a character font which are more conspicuous than those used for an icon 92 (FIG. 7(b)) displaying the name of the link destination OPQ. In this manner, the television receiver 10 may change the displayed form of the icon by changing not only the size and color of the icon but also the character font and bitmap data for the icon. Alternatively, the television receiver 10 may display the icon on the monitor 17 and output different audio messages depending on whether or not the received link destination information corresponds to the specific link destination. In order to change and output the icon and audio in the above-described manner, a plurality of bitmap data, font data, audio messages, etc., may be previously stored in the television receiver 10.

Referring back to FIG. 3, the user recognizes the icon displayed on the monitor 17 or the audio message which is output simultaneously with the displaying of the icon and determines whether or not to store the received bookmark data in the television receiver 10. The user instructs the television receiver 10 to store the received bookmark data by, for example, pressing a button on the remote control 21, as necessary. The micom 20 determines whether or not the remote control 21 or the like has provided an instruction to store the bookmark data (step S16). If provided (Yes at step S16), the micom 20 writes the bookmark data received at step S11 to the bookmark data storing section 24 (step S17). Otherwise (No at step S16), the micom 20 does not perform any process to write the bookmark data. In this manner, the television receiver 10 stores the received bookmark data in accordance with the user's instruction, thereby ending the process for receiving the bookmark data.

An operation of the television receiver 10 will now be described with respect to the case of accessing the link destination (see FIG. 4). After viewing a program, an advertisement, or the like, the user instructs the television receiver 10 to display a list of bookmark data by, for example, pressing a button on the remote control 21. The micom 20 receives the instruction to display the list of bookmark data from the remote control 21 or the like (step S21). Next, the micom 20 reads the bookmark data, which has been written in the bookmark data storing section 24 at step S17, and extracts a name of a link destination and a link destination URL from the read bookmark data (step S22). In the case where the process of step S17 has been performed a plurality of times before the process of step S22 is performed, the micom 20 reads a plurality of bookmark data from which a plurality of names and link destination URLs are read. In the first embodiment, the micom 20 reads the bookmark data in accordance with the user's instruction. However, instead of this, the micom 20 may spontaneously read the bookmark data when the end of a program having been viewed or a switch between programs is detected.

Next, the micom 20 refers to the name of the link destination and the link destination URL, which have been extracted at step S22, to check whether or not any link destination information received during the broadcast of the program or advertisement is stored in the specific link destination information storing section 31 (step S23). In this case, the micom 20 may check the name of the link destination and the link destination URL with respect to perfect matching of both of them, perfect matching of either one of them, or matching based on other determination criteria.

In the case where any link destination information is stored in the specific link destination information storing section 31 (Yes at step S23), the micom 20 determines that specific link destination information is contained in the received link destination information, and the procedure proceeds to step S24. In this case, the micom 20 creates a list of link destinations in which specific link destinations are listed first and followed by other link destinations. The micom 20 controls the OSD controller 16 so as to create an image of the link destination list. Consequently, the link destination list in which the specific link destinations are listed first and followed by other link destinations is displayed as a video image of the television broadcast on the monitor 17 (step S24). In such a case, the specific link destinations are displayed in a highlighted manner as compared to other link destinations.

On the other hand, in the case where any link destination information is not stored in the specific link destination information storing section 31 (No at step S23), the micom 20 determines that no specific link destination information is contained in the received link destination information, and the procedure proceeds to step S25. In this case, the micom 20 creates a list of link destinations in which the link destinations are listed in the order they were read at step S22. The micom 20 controls the OSD controller 16 so as to create an image of the link destination list. Consequently, the link destination list in which link destinations other than the specific link destinations are listed in the order they were read at step S22 is displayed as a video image of the television broadcast on the monitor 17 (step S25). In this manner, the television receiver 10 presents the link destination lists in different forms to the user depending on whether or not any specific link destination information is contained in the link destination information received during the broadcast of the program or advertisement. By highlighting the specific link destinations listed in top positions, it is possible to promote the user's interest in the specific link destinations, thereby increasing the number of accesses to the specific link destinations.

Figures 8, 9:
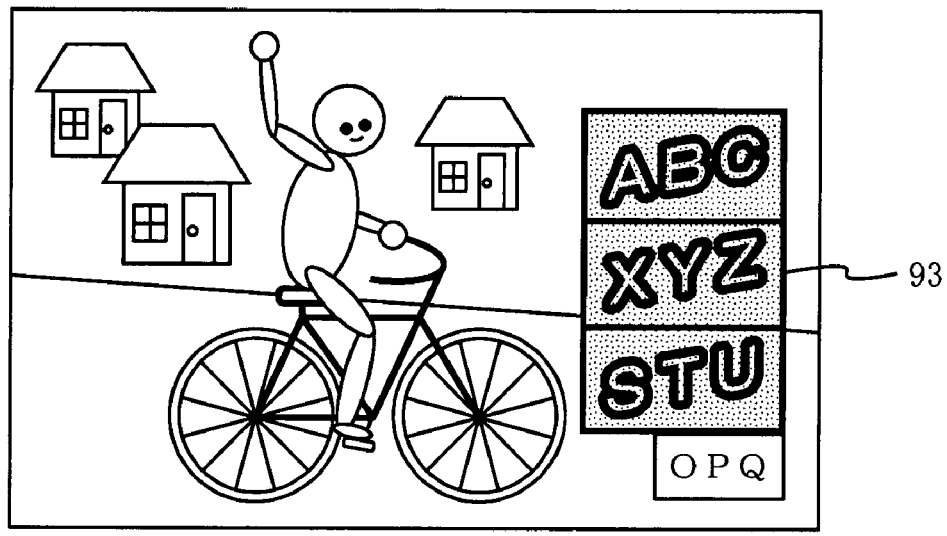
FIG. 8 is a diagram illustrating a displayed screen image in the case where the television receiver according to the first embodiment of the present invention displays a list of link destinations.
FIG. 9 is a diagram illustrating how an access history is stored in an access history storing section of the television receiver according to the first embodiment of the present invention.

A method for changing the displayed form of the link destination list will be described with reference to FIG. 8. FIG. 8 is a diagram illustrating a displayed screen image obtained by superimposing the link destination list on the same video image of the television broadcast illustrated in FIG. 7. In this example, it is assumed that link destination information for link destinations ABC, XYZ, STU, and OPQ are transmitted during the broadcast of a program, an advertisement, or the like, and the first three link destinations mentioned above are specific link destinations but the link destination OPQ is not a specific link destination. The specific link destination information storing section 31 stores link destination information for the first three link destinations but does not store link destination information for the link destination OPQ.

FIG. 8 illustrates a displayed screen image in the case where the user provides an instruction to display a list of link destinations under the above-described assumption. In a link destination list 93 illustrated in FIG. 8, the link destinations ABC, XYZ, and STU, which are specific link destinations, are displayed first (i.e., preferentially listed in top positions) and highlighted by using a character size, a character font, background design, and a column width which are conspicuous as compared to those used for the link destination OPQ which is not a specific link destination. In this manner, the television receiver 10 may change the displayed form of each link destination in the link destination list by changing not only the display order but also a size and a color of the icon, a character font, bitmap data of the icon, the column width, etc. It goes without saying that the television receiver 10 may change the displayed form of each link destination in the link destination list by changing only the display order. In this manner, in order to change the displayed form of each link destination in the link destination list, a plurality of types of bitmap data, font data, etc., may be previously stored in the television receiver 10.

Referring back to FIG. 4, the user recognizes the link destination list displayed on the monitor 17, and designates a link destination to be accessed among the displayed link destinations by, for example, pressing a button on the remote control 21. The micom 20 receives the link destination designation from the remote control 21 or the like (step S26). Next, the micom 20 checks whether or not link destination information designated at step S26 is stored in the specific link destination information storing section 31 (step S27). The process of step S27 is the same as that of step S13 except that targets of the processes are different.

In the case where the designated link destination information is not stored in the specific link destination information storing section 31 (No at step S27), the micom 20 determines that the designated link destination information does not correspond to a specific link destination, and the procedure proceeds to step S29. In the case where the designated link destination information is stored in the specific link destination information storing section 31 (Yes at step S27), the micom 20 determines that the designated link destination information corresponds to a specific link destination, and the procedure proceeds to step S28. In such a case, the micom 20 updates the access history stored in the access history storing section 32 (step S28).

FIG. 9 is a diagram illustrating how the access history is stored in the access history storing section. As described above, in the first embodiment, the access history storing section 32 stores an access history about specific link destinations. The access history storing section 32 illustrated in FIG. 9 stores names 81, link destination URLs 82, and the number of accesses 83 of three specific link destinations such that the name, the link destination URL, and the number of accesses of each specific link destination are associated with each other. In this example, the number of accesses to the link destination ABC is 0, and the number of accesses to the link destination STU is 20. Although no data is stored in the fourth and subsequent regions yet, these regions are used for additionally storing specific link destinations later.

Although the access history storing section 32 illustrated in FIG. 9 stores the names 81 and the link destination URLs 82 in addition to the number of accesses 83, the access history storing section 32 is not necessarily required to store the names 81 and the link destination URLs 82 so long as the micom 20 can associate each specific link destination with its number of accesses 83.

In a typical configuration example derived from the data structure illustrated in FIG. 9, at step S28, the micom 20 adds one to the number of accesses 83 of the specific link destination information stored in the access history storing section 32. Alternatively, the micom 20 may add a prescribed number to the number of accesses 83 when the specific link destination is accessed the prescribed number of times.

Next, referring back to FIG. 4, the micom 20 obtains information from the designated link destination and causes the obtained information to be displayed on the monitor 17 (step S29). More specifically, the micom 20 controls the modem 23 so as to connect with the information server 42 at the link destination, receives information from the information server 42 according to a prescribed data transfer protocol and causes the received information to be displayed on the monitor 17. Thereafter, the television receiver 10 terminates the process of step S29 according to the user's instruction, thereby ending the process for accessing the link destination.

Next, an operation of the television receiver 10 will be described with reference to the case of transmitting an access history (see FIG. 5). The micom 20 receives via the modem 23 an access history transmission command from the information server 42 (step S31). Next, the micom 20 reads the access history stored in the access history storing section 32 and controls the modem 23 so as to transmit the read access history to the information server 42 (step S32). Next, the micom 20 initializes the access history stored in the access history storing section 32 (step S33). Note that the process illustrated in FIG. 5 is typically performed at a frequency of about once every several days or once every several tens of days. In the first embodiment, the micom 20 transmits the access history according to the access history transmission command. However, instead of this, the micom 20 may spontaneously transmit the access history on a regular basis.

The information server 42 is connected to a plurality of television receivers via the internet 2 or other communication lines (not shown). The information server 42 receives an access history from each television receiver and summarizes the received access histories. Consequently, the information server 42 can obtain various statistics with respect to accesses from each television receiver to the specific link destination. In particular, by selecting a link destination provided as a specific link destination by the bookmark service, the information server 42 can obtain the number of accesses in the case where the link destination is accessed via the bookmark service.

The following are conceivable methods for providing the television receiver 10 with specific link destination information. As a first method, it is conceivable to previously write the specific link destination information to the specific link destination information storing section 31 before shipping the television receiver 10. As a second method, it is conceivable to transmit the specific link destination information from the information server 42 to the television receiver 10 during the operation of the television receiver 10, so that the micom 20 writes received specific link destination information to the specific link destination information storing section 31. As a third method, it is conceivable to use an engineering slot to download the specific link destination information into the television receiver 10 during the operation of the television receiver 10, so that the micom 20 writes the downloaded specific link destination information to the specific link destination information storing section 31. According to the second and third methods, the information server 42 or the television broadcasting system 41 provides the specific link destination information, which is identification information for identifying whether or not the link destination is a specific link destination, so that the number of accesses to any link destination can be freely obtained by suitably changing the specific link destination in each television receiver.

The following method using a company region included in the bookmark type 66 of the bookmark data is also conceivable. Before receiving the television broadcast, information inherent to the manager of the specific link destination (for example, information arbitrarily defined by the manager), in addition to the name and URL of the specific link destination, is stored in the specific link destination information storing section 31. The television receiver 10 extracts, at step S12, the name of the link destination, the link destination URL, and information in the company region from the received bookmark data, and determines, at step S13, whether or not the link destination is a specific link destination according to whether or not these three pieces of information are stored in the specific link destination information storing section 31. Consequently, the television receiver 10 can confirm that the received link destination information is related to the specific company.

As described above, the television receiver according to the first embodiment stores the specific link destination information as the identification information for determining whether or not the link destination is a specific link destination and changes a process to be performed on the link destination depending on whether or not received link destination information is included in the stored specific link destination information. The television receiver highlights the specific link destination when displaying link destinations as icons, lists the specific link destination first when displaying a list of link destinations, and obtains and transmits an access history about the specific link destination to the information server. By receiving access histories from television receivers and summarizing the received access histories, various statistics can be obtained with respect to accesses to the specific link destination. For example, by selecting the link destination provided by the bookmark service of the digital broadcasting as the specific link destination, it is possible to obtain the number of accesses in the case where the link destination is accessed via the bookmark service. In this manner, the television receiver according to the first embodiment can solve problems of the conventional television receiver, e.g., the specific link destination cannot be displayed in a distinguished manner, the specific link destinations cannot be distinguished to obtain respective access histories, and so on.

In the above description, the information server at step S29 and the information server at step S32 may be identical to each other or may be different servers managed by different managers.

The television receiver 10 changes the process to be performed on the link destination depending on whether or not the link destination is a specific link destination. However, it goes without saying that the television receiver 10 changes the process only when such a change is preferable. For example, the television receiver 10 may not perform the processes of steps S13-S16 but may store all the received bookmark data. Alternatively, the television receiver 10 may not perform the process of step S23 but may list all the link destinations in the same form. Still alternatively, the television receiver 10 may not perform the process of step S27 but may store access histories not only about specific link destinations but also about all the link destinations. Still alternatively, the television receiver 10 may not perform the processes of steps S27, S28, and S31-S33, i.e., processes for storing and transmitting access histories.

Second Embodiment

Figure 10:
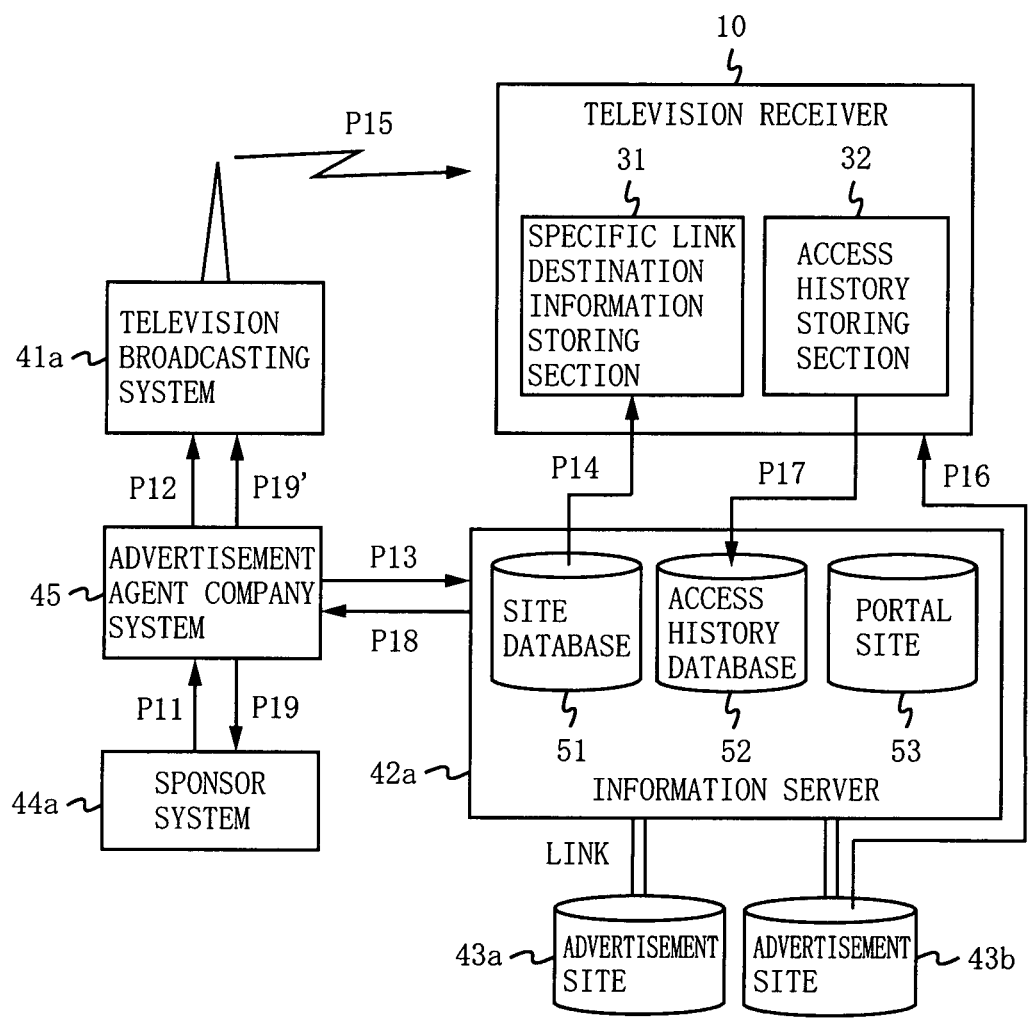
FIG. 10 is a diagram illustrating a method for counting the number of accesses according to a second embodiment of the present invention.

FIG. 10 is a diagram illustrating a method for counting the number of accesses according to a second embodiment of the present invention. The method for counting the number of accesses according to the second embodiment counts the number of accesses in the case where the television receiver 10, according to the first embodiment, accesses the specific link destination. In this method, as illustrated in FIG. 10, transmission and reception of data are performed between the television receiver 10, a television broadcasting system 41a, an information server 42a, advertisement sites 43a and 43b, a sponsor system 44a, and an advertisement agent company system 45. In FIG. 10, for simplification of the drawing, only one television receiver 10 is illustrated, however, in actual practice, the number of accesses from a plurality of television receivers is counted.

In FIG. 10, as described in the first embodiment, the television receiver 10 has a television broadcast receiving function and an information acquisition function. The television receiver 10 further has a function of storing specific link destination information in the specific link destination information storing section 31 and a function of storing an access history about the specific link destination in the access history storing section 32 and transmitting the access history at a prescribed time.

The information server 42a corresponds to the information server 42 of FIG. 1 and is illustrated in more detail. The information server 42a provides a portal site 53 connected to the internet and summarizes the access history stored in the television receiver 10. Accordingly, the information server 42a is provided with a site database 51 having site management information stored therein and an access history database 52 for summarizing the access history.

The advertisement sites 43a and 43b are connected to the internet and provide advertisement information to various terminal apparatuses including the television receiver 10. The portal site 53 is linked to the advertisement sites 43a and 43b. The television broadcasting system 41a is obtained by adding a function of receiving the number of accesses to the specific link destination to the television broadcasting system 41 illustrated in FIG. 1. The sponsor system 44a is operated by the sponsor who operates the advertisement sites 43a and 43b. The advertisement agent company system 45 is operated by an advertisement agent company which performs operations of providing advertisements at the request of the sponsor.

By way of example, the case of counting the number of accesses to the advertisement site 43b will be described below. In order to enhance an advertising effect by causing the television receiver 10 to access the advertisement site 43b, the sponsor operating the advertisement site 43b requests the advertisement agent company that the advertisement site 43b becomes a target of the bookmark service. In such a case, the sponsor system 44a transmits bookmark service request information to the advertisement agent company system 45 (P11 of FIG. 10).

The advertisement agent company produces, in response to the request from the sponsor, a video image of commercial messages broadcast in the television broadcasting (hereinafter, referred to as the "CM video image") and bookmark data to be included in and transmitted with a television signal of the data broadcasting. The bookmark data includes link destination information for accessing the advertisement site operated by the sponsor (in this example, the advertisement site 43b). The advertisement agent company provides the produced CM video image and bookmark data to a television broadcasting station. In this case, the CM video image and bookmark data produced by the advertisement agent company are transmitted from the advertisement agent company system 45 to the television broadcasting system 41a (P12).

Further, the advertisement agent company requests a company operating the portal site 53 (hereinafter, referred to as the "portal site operator company") to treat the advertisement site operated by the sponsor as a specific link destination. In such a case, specific link destination registration request information is transmitted from the advertisement agent company system 45 to the information server 42a (P13). The portal site operator company updates the site database 51 in response to the request from the advertisement agent company. Attribute information of the advertisement site, which is requested to be treated as the specific link destination by the advertisement agent company (in this example, the name and link destination URL of the advertisement site 43b, etc.), is stored in the site database 51 as specific link destination information.

The information server 42a regularly communicates with the television receiver 10 to transmit the specific link destination information stored in the site database 51 thereto. The television receiver 10 writes the specific link destination information transmitted by the information server 42a to the specific link destination information storing section 31 (P14).

After the specific link destination information is stored in the television receiver 10, the television broadcasting system 41a broadcasts the CM video image and bookmark data received from the advertisement agent company system 45 (P15). The CM video image is typically broadcast so as to be included in a television broadcast program, and the bookmark data is included in and transmitted with a television signal when the CM video image is being broadcast.

The television receiver 10 receives a television signal transmitted by the television broadcasting system 41a and outputs video and audio. As described in the first embodiment, the television receiver 10 performs three types of processes, i.e., the bookmark data receiving process (FIG. 3), the link destination accessing process (FIG. 4), and the access history transmitting process (FIG. 5). Specifically, when the television receiver 10 receives bookmark data from the television broadcasting system 41a, the television receiver 10 stores the bookmark data in the bookmark data storing section according to the user's instruction. Further, when the television receiver 10 accesses the specific link destination, the television receiver 10 updates the access history stored in the access history storing section 32 (P16). In this example, the advertisement site 43b is selected as the specific link destination, and therefore the television receiver 10 updates the access history when it accesses the advertisement site 43b.

The information server 42a transmits an access history transmission command to the television receiver 10 on a regular basis (e.g., at a frequency of about once every several days or once every several tens of days). When the television receiver 10 receives the access history transmission command from the information server 42a, the television receiver 10 transmits the access history stored in the access history storing section 32. The information server 42a transmits the access history transmission command to all the target television receivers and receives access histories from all of them. The received access histories are stored in the access history database 52 (P17).

Next, the information server 42a summarizes the access histories stored in the access history database 52. Consequently, the information server 42a can obtain various statistics with respect to accesses from a plurality of television receivers to the specific link destination. In this example, the advertisement site 43b provided by the bookmark service is selected as the specific link destination, and therefore the information server 42a can obtain the number of accesses in the case where the advertisement site 43b is accessed by the plurality of television receivers via the bookmark service. The information server 42a transmits a result of summarizing the access histories to the advertisement agent company system 45 (P18). In this manner, the advertisement agent company can recognize the number of accesses in the case where the advertisement site 43b is accessed via the bookmark service.

The advertisement agent company provides the result of summarizing access histories obtained by the information server 42a. In this case, the result of summarizing the access histories is transmitted from the advertisement agent company system 45 to the sponsor system 44a (P19). In this manner, the advertisement agent company can provide to the sponsor, as an index for quantitatively indicating the effectiveness of their own activities, the number of accesses in the case where the advertisement site operated by the sponsor is accessed via the bookmark service. Moreover, the sponsor can estimate the effectiveness of the activities of the advertisement agent company based on the number of accesses provided.

The advertisement agent company may not only provide the sponsor with the result of summarizing the access histories but also provide the television broadcasting station with the result of summarizing the access histories. In such a case, the result of summarizing the access histories is transmitted from the advertisement agent company system 45 to the television broadcasting system 41a (P19'). The advertisement agent company system 45 may perform first either one of the process for transmitting the CM video image and the bookmark data to the television broadcasting system (P12) and the process for transmitting the specific link destination registration request information to the information server 42a (P13).

In the case of performing the method for counting the number of accesses according to the second embodiment, it is conceivable that the sponsor makes a lump sum payment to the advertisement agent company for prices of producing of the CM video image and the bookmark data, broadcasting of the bookmark data, counting of the number of accesses, etc., and the advertisement agent company distributes part of the received prices to the portal site operator company and the broadcasting station. In such a case, the number of accesses to the advertisement site which is counted by the information server 42a is considered as the index for indicating the effectiveness of the advertisement agent company's activities. Accordingly, the sponsor may increase the amount paid to the advertisement agent company as the number of accesses to the advertisement site increases. Thus, according to the method for counting the number of accesses according to the second embodiment, it is possible to provide a reasonable business form which decides the amount of prices depending on the number of accesses to the advertisement site. The advertisement agent company may make a payment to the manufacturer, which produced the television receiver 10, for an additional cost of providing the television receiver 10 with the specific link destination information storing section 31 and the access history storing section 32.

As described above, according to the method for counting the number of accesses of the second embodiment, the following operations are carried out under the management of the advertisement agent company: identification information for identifying whether or not the link destination is a specific link destination is provided to each television receiver; a television signal including link destination information of an advertisement site is transmitted; an access history transmitted by each television receiver is received; the number of accesses to the specific link destination is obtained based on the access history received from each television receiver; and the number of accesses obtained is further provided to the sponsor system or the television broadcasting system. In particular, the number of accesses in the case where the advertisement site is accessed via the bookmark service is obtained by selecting as the specific link destination the advertisement site provided by the bookmark service of the digital broadcasting. Accordingly, the advertisement agent company can provide, to the sponsor or the broadcasting station, the number of accesses in the case where the advertisement site operated by the sponsor is accessed via the bookmark service as the index for quantitatively indicating the effectiveness of their own activities. The sponsor can evaluate the effectiveness of the advertisement agent company's activities based on the number of accesses provided.

Third Embodiment

Figure 11:
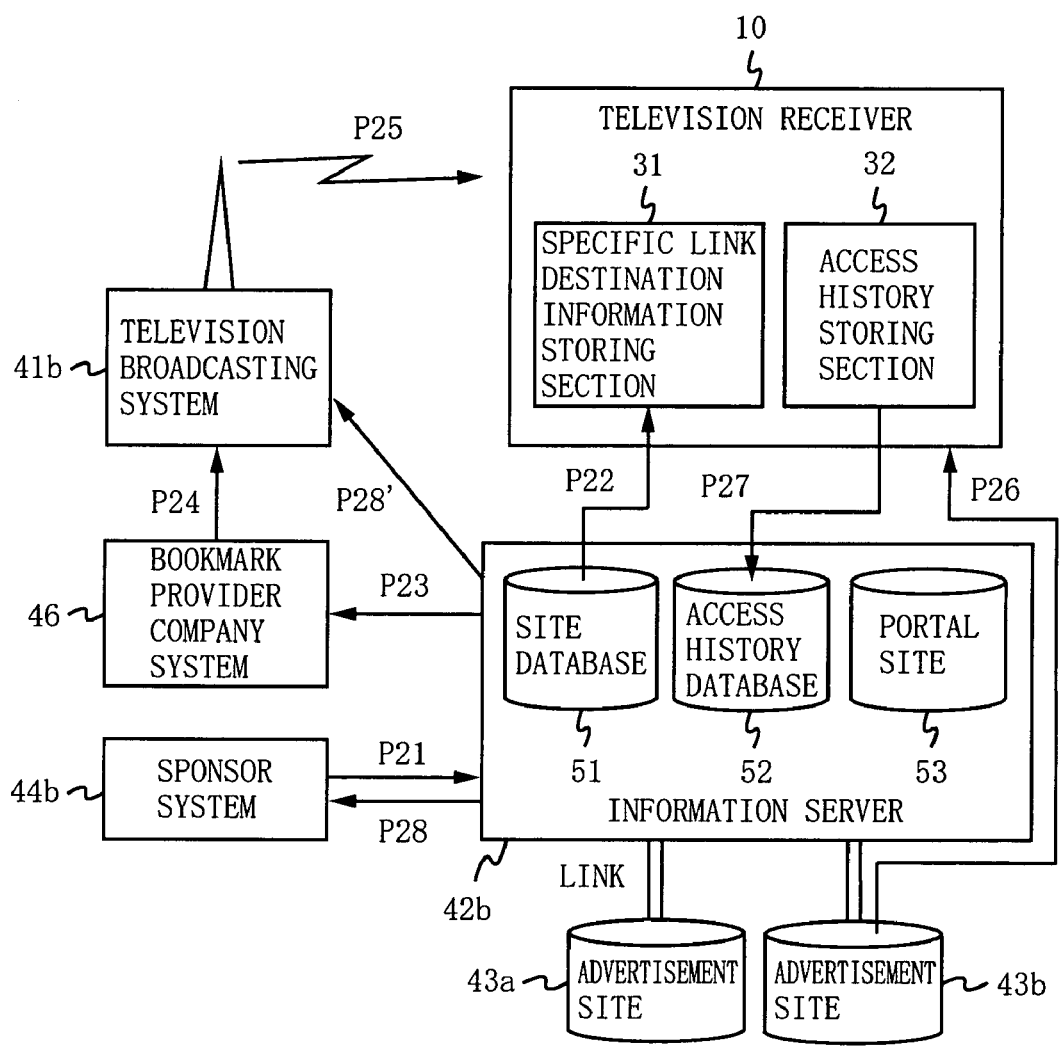
FIG. 11 is a diagram illustrating a method for counting the number of accesses according to a third embodiment of the present invention.
Figure 12:
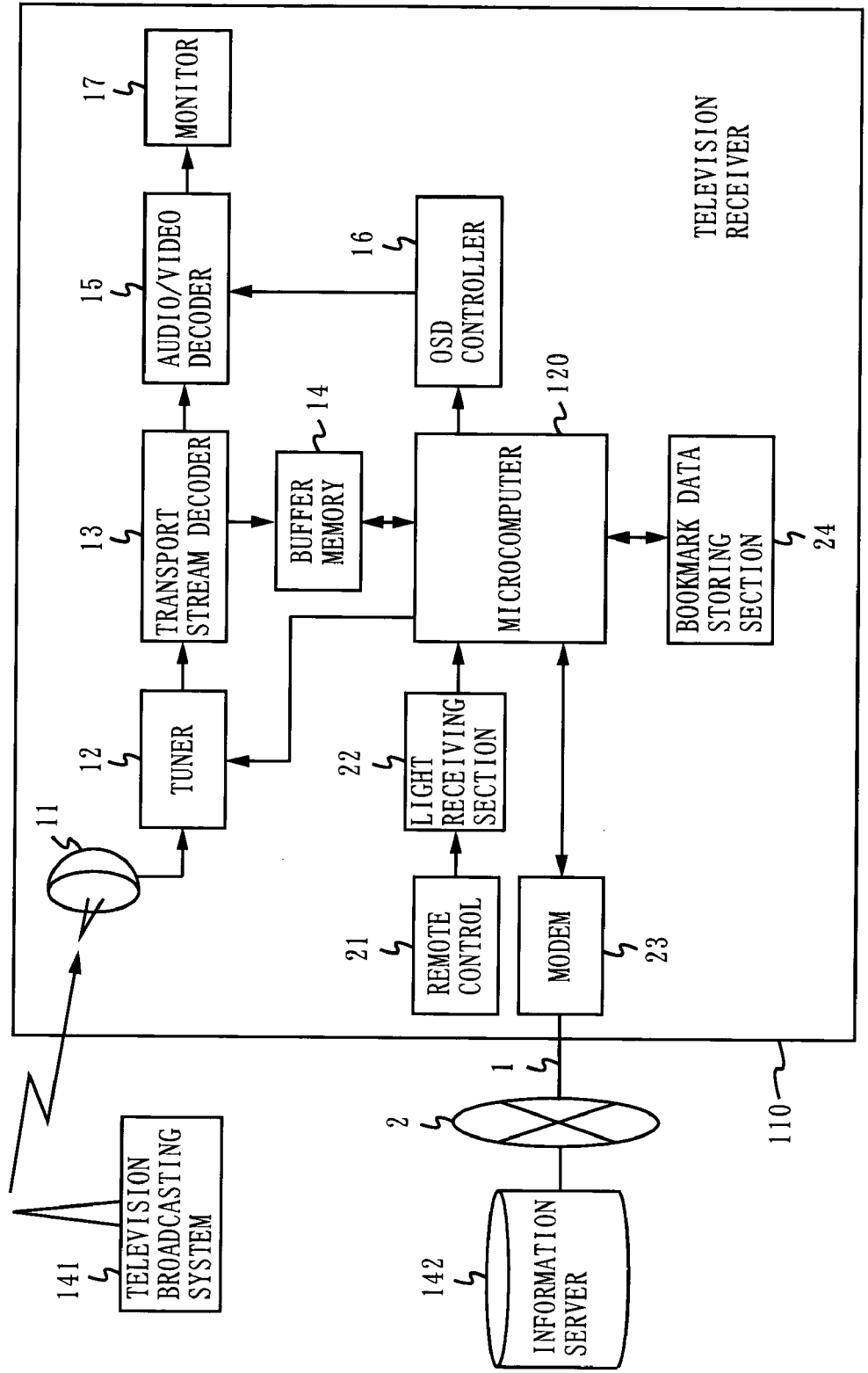
FIG. 12 is a diagram illustrating the configuration of a conventional television receiver.
Figure 13:
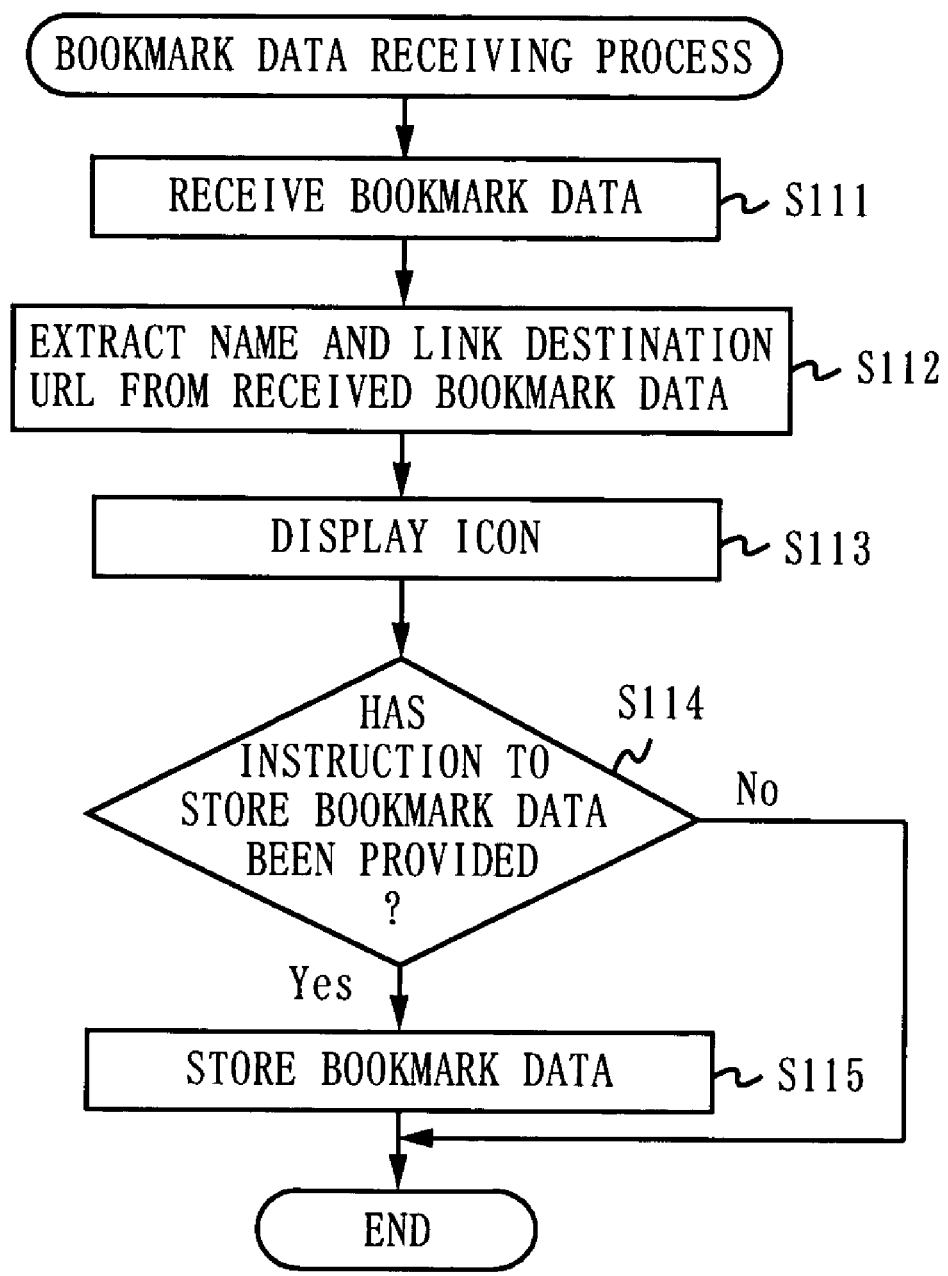
FIG. 13 is a flowchart of a bookmark data receiving process of the conventional television receiver.
Figure 14:
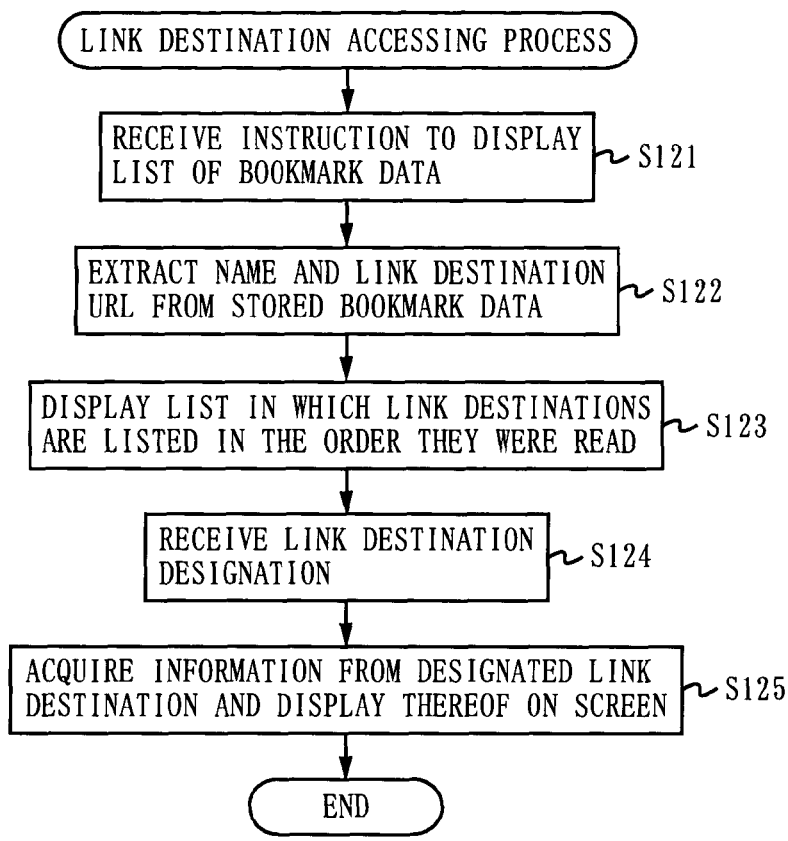
FIG. 14 is a flowchart of a link destination accessing process of the conventional television receiver.
Figure 15:
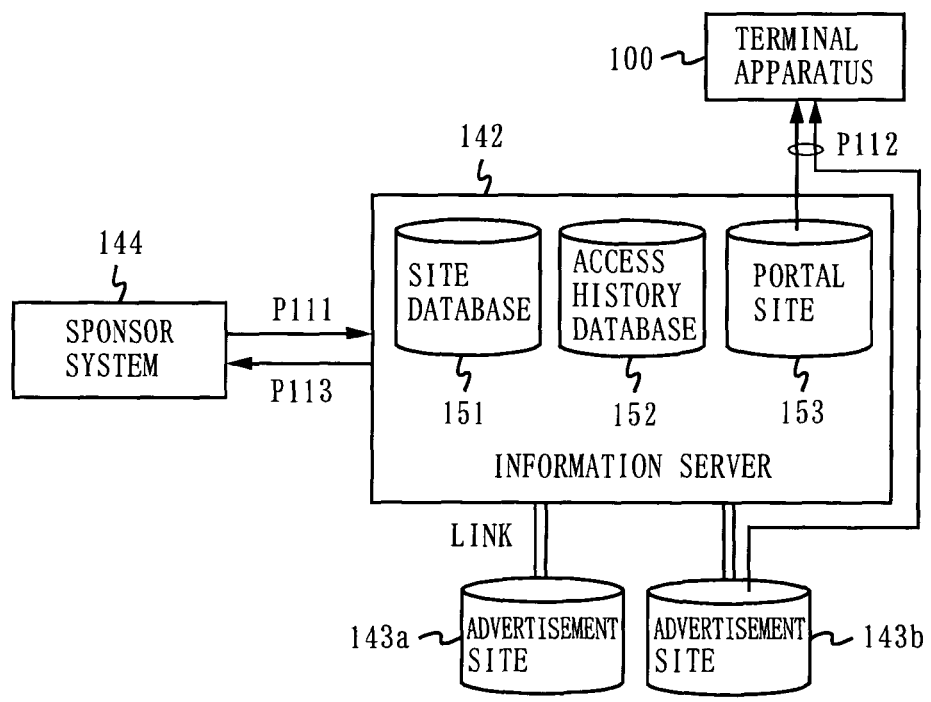
FIG. 15 is a diagram illustrating a conventional method for counting the number of accesses.

FIG. 11 is a diagram illustrating a method for counting the number of accesses according to a third embodiment of the present invention. Similar to the second embodiment, the method for counting the number of accesses according to the third embodiment counts the number of accesses in the case where the television receiver 10 according to the first embodiment accesses the specific link destination. In this method, as illustrated in FIG. 11, transmission and reception of data is performed between the television receiver 10, a television broadcasting system 41b, an information server 42b, advertisement sites 43a and 43b, a sponsor system 44b, and a bookmark provider company system 46. As in the case of FIG. 10, in FIG. 11, other television receivers targeted for counting of the number of accesses are omitted.

In FIG. 11, the bookmark provider company system 46 is a system operated by a company producing the bookmark data. The television receiver 10 and the advertisement sites 43a and 43b are the same as those for the second embodiment. Functions and configurations of the television broadcasting system 41b, the information server 42b, and the sponsor system 44b are almost the same as those for the second embodiment. Accordingly, as in the case of the second embodiment, the case where the number of accesses to the advertisement site 43b is counted is described below, mainly with respect to the variation from the second embodiment.

The sponsor operating the advertisement site 43b requests the company operating the portal site 53 (the portal site operator company) that the advertisement site 43b becomes a target of the bookmark service. In such a case, bookmark service request information is transmitted from the sponsor system 44b to the information server 42b (P21 of FIG. 11). In response to the sponsor's request, the portal site operator company treats the link destination requested to be the target by the sponsor (in this case, the advertisement site 43b) as a specific link destination and updates the site database 51. Attribute information of the advertisement site which is requested to be treated as the specific link destination by the sponsor company (in this example, the name and link destination URL of the advertisement site 43b, etc.) is stored in the site database 51 as the specific link destination information.

Next, similar to the process of P14 illustrated in FIG. 10, the specific link destination information stored in the site database 51 of the information server 42b is written to the specific link destination information storing section 31 of the television receiver 10 (P22).

The portal site operator company requests the bookmark provider company to produce and broadcast the bookmark data. In this case, bookmark data production request information is transmitted from the information server 42b to the bookmark provider company system 46 (P23).

On the request of the portal site operator company, the bookmark provider company produces bookmark data, which includes link destination information of a site requested to be treated as the link destination by the portal site operator company (in this case, the advertisement site 43b), and provides the bookmark data to the television broadcasting station. In this case, the bookmark data produced by the bookmark provider company is transmitted from the bookmark provider company system 46 to the television broadcasting system 41b (P24).

Next, similar to the processes of P15 to P17 illustrated in FIG. 10, the television broadcasting system 41b broadcasts the CM video image and the bookmark data (P25), the television receiver 10 accesses the specific link destination and updates the access history (P26), and an access history obtained by each television receiver is collected into the access history database 52 (P27). Note that the sponsor or the advertisement agent company provides, by means not shown in the figure, the CM video image transmitted by the television broadcasting system 41b.

Next, as in the case of the second embodiment, the information server 42b summarizes the access histories stored in the access history database 52 and obtains various statistics with respect to accesses from a plurality of television receivers to the specific link destination. In this example, the advertisement site 43b is selected as the specific link destination, and therefore the information server 42b can obtain the number of accesses in the case where the advertisement site 43b is accessed by the plurality of television receivers via the bookmark service. In this manner, the portal site operator company can recognize the number of accesses in the case where the advertisement site 43b is accessed via the bookmark service.

The portal site operator company provides the sponsor with the result of summarizing the access histories obtained by the information server 42b. In this case, the result of summarizing the access histories is transmitted from the information server 42b to the bookmark provider company system 46. In this manner, the portal site operator company can provide, to the sponsor, the number of accesses in the case where the advertisement site operated by the sponsor is accessed via the bookmark service as the index for quantitatively indicating the effectiveness of their own activities. Further, the sponsor can evaluate the effectiveness of the portal site operator company based on the number of accesses provided.

The portal site operator company may provide the result of summarizing the access histories not only to the sponsor but also to the television broadcasting station. In such a case, the result of summarizing the access histories is transmitted from the information server 42b to the television broadcasting system 41b (P28'). The information server 42b may perform first either one of the process for transmitting the specific link destination information to the television receiver 10 (P22) and the process for transmitting bookmark data production request information to the bookmark provider company system 46 (P23).

The portal site operator company may also serve as the bookmark provider company. The information server 42b may obtain not only the access histories via the bookmark service which is collected from the television receiver 10 but also the access histories in the case where the specific link destination is accessed via the portal site 53, so as to provide the sponsor system 44b and the television broadcasting system 41b with the sum of the number of accesses via the bookmark service and the number of accesses via the portal site 53 as the number of accesses to the specific link destination.

The method for counting the number of accesses according to the third embodiment is the same as that of the second embodiment except that the execution entity is the portal site operator company in the method of the third embodiment while the execution entity is the advertisement agent company in the method of the second embodiment. Accordingly, the method of the third embodiment is the same as that of the second embodiment with respect to the meaning of the number of accesses counted and the following points: the number of accesses counted is reflected by the amounts paid from the sponsor to the portal site operator company; and the portal site operator company pays the manufacturer of the television receiver 10 the additional cost for providing a storing section in the television receiver 10.

As described above, according to the method for counting the number of accesses of the third embodiment, the following operations are carried out under the management of the portal site operator company: identification information for identifying whether or not the link destination is a specific link destination is provided to each television receiver; a television signal including link destination information of an advertisement site is transmitted; an access history transmitted by each television receiver is received; the number of accesses to the specific link destination is obtained based on the access history received from each television receiver; and the number of accesses obtained is provided to the sponsor system or the television broadcasting system. Effects achieved by the third embodiment are the same as those achieved by the second embodiment except that the entity which counts and provides the number of accesses is the portal site operator company.

As described above, a television receiving apparatus according to the present invention determines whether or not the link destination is a specific link destination using identification information and changes a process to be performed on the link destination. Therefore, the television receiving apparatus according to the present invention can be used for highlighting the specific link destination when the link destinations are displayed as icons, displaying the specific link destination first when a list of the link destinations, and counting the number of accesses to the specific link destination.

The invention claimed is:

1. A television receiver having a television broadcast receiving function and an information acquisition function, the television receiver comprising:

a television broadcast receiving section operable to output video and audio information based on a received television signal;

a link destination information extracting section operable to extract attribute information of accessible link destinations from the received television signal;

an information acquisition section operable to acquire information from the link destinations designated by a user by using attribute information extracted by the link destination information extracting section;

an identification information storing section operable to store, in advance, identification information for identifying specific link destinations which are accessed by the television receiver and whose access is subject to notification;

a control section operable to change a manner in which the accessible link destinations are displayed and change a sound output in accordance with a determination as to whether or not the attribute information extracted by the link destination information extracting section is contained in the identification information stored in the identification information storing section, wherein the accessible link destinations are determined to be the specific link destinations when the attribute information is stored in the identification information storing section, and the accessible link is destinations are determined not to be the specific link destinations when the attribute information is not stored in the identification information storing section;

a presenting section operable to, present the accessible link destinations by using a prescribed displayed form when the accessible link destinations are determined not to be specific link destinations, and present the accessible link destinations as an audio output or in a displayed form which is more highlighted than the prescribed displayed form when the accessible link destinations are determined to be the specific link destinations based on the determination by the control section, the accessible link destinations being presented by superimposing the accessible link destinations as a list of accessible link destinations, the list including both accessible link destinations determined to be the specific link destinations and the accessible link destinations determined not to be the specific link destinations, on an image obtained from a received television signal and currently being displayed;

a comparing section operable to compare the accessible link destination with the specific link destinations to determine whether or not attribute information extracted by the link destination information extracting section is contained in the identification information stored in the identification information storing section;

a link destination designating section operable to allow the user to designate link destinations presented by the presenting section; and an access history storing section operable to store an access history to the link destinations which are presented by the presenting section and which are designated by the user, wherein, among link destinations presented by the presenting section, only when the link destinations determined to be the specific link destinations are designated by the user, the control section updates the access history and transmits the access history at a prescribed time to an information server connected to a communication line, and wherein the access history includes information indicating that the user has designated specific link destinations.

2. The television receiver according to claim 1, wherein when the presenting section displays the accessible link destinations using icons, the presenting section is operable to change a displayed form of the icons based on the determination of the control section.

3. The television receiver according to claim 1, wherein when the presenting section displays a list of accessible link destinations, the presenting section is operable to change a displayed form for each accessible link destination based on the determination of the control section.

4. The television receiver according to claim 1, wherein the control section is operable to receive the identification information from the information server and is operable to write the received identification information to the identification information storing section.

5. The television receiver according to claim 1, wherein the control section is operable to extract the identification information from television receiver maintenance data, which is included in the received television signal, and is operable to write the extracted attribute information to the identification information storing section.

6. The television receiver according to claim 1, wherein:

the link destination information extracting section is operable to extract at least address information of the accessible link destinations as the attribute information;

the identification information storing section is operable to store at least address information of the specific link destinations as the identification information; and the control section is operable to determine whether or not the accessible link destinations are the specific link des- 7. The television receiver according to claim 1, wherein:
the link destination information extracting section is operable to extract at least a name and address information of the accessible link destinations as the attribute information;
the identification information storing section is operable to store at least a name and address information of the specific link destinations as the identification information; and
the control section is operable to determine whether or not the link destinations are the specific link destinations by determining whether or not the attribute information extracted by the link destination information extracting section is stored in the identification information storing section.

8. The television receiver according to claim 1, wherein:
the link destination information extracting section is operable to extract at least a name, address information, and manager information of the accessible link destinations as the attribute information;
the identification information storing section is operable to store at least a name, address information, and manager information of the specific link destinations as the identification information; and
the control section is operable to determine whether or not the accessible link destinations are the specific link destinations by determining whether or not the attribute information is stored in the identification information storing section.

9. A method for counting a number of accesses when a plurality of television receivers are operable to access specific link destinations, the method being performed when each of the television receivers includes:
a communication section;
a television broadcast receiving section operable to output video and audio information based on a received television signal;
a link destination information acquisition section operable to extract attribute information of accessible link destinations from the television signal;
an information acquisition section operable to acquire information from the link destinations designated by a user by using the attribute information;
an identification information storing section operable to store, in advance, identification information for identifying specific link destinations which are accessed by the television receiver and whose access is subject to notification;
an access history storing section operable to store an access history about the accessible link destinations;
a control section operable to perform a process for determining that the accessible link destinations are the specific link destinations only when the accessible link destinations are determined to be the specific link destinations in accordance with a determination as to whether or not the attribute information is contained in the identification information stored in the identification information storing section, and determining that the link destinations are not the specific link destinations when the attribute information is not stored in the identification information storing section, and operable to perform a process for updating the access history when the information acquisition section accesses the specific link destinations, and transmit the access history at a prescribed time by using the communication section;
a presenting section operable to, present the accessible link destinations by using a prescribed displayed form when the accessible link destinations are determined not to be specific link destinations, and present the accessible link destinations as an audio output or in a displayed form which is more highlighted than the prescribed displayed form when the accessible link destinations are determined to be the specific link destinations, based on the determination by the control section, the accessible link destinations being presented by superimposing the accessible link destinations as a list of accessible link destinations, the list including both accessible link destinations determined to be the specific link destinations and the accessible link destinations determined not to be the specific link destinations, on an image obtained from a received television signal and currently being displayed;
a comparing section operable to compare the accessible link destinations with the specific link destinations to determine whether or not attribute information extracted by the link destination information extracting section is contained in the identification information stored in the identification information storing section;
a link destination designating section operable to allow the user to designate link destinations presented by the presenting section; and
an access history storing section operable to store an access history to the link destinations which are presented by the presenting section and which are designated by the user,
wherein, among link destinations presented by the presenting section, only when the link destinations determined to be the specific link destinations are designated by the user, the control section updates the access history and transmits the access history at a prescribed time to an information server connected to a communication line, and
wherein the access history includes information indicating that the user has designated the specific link destinations, the method comprising:
providing the identification information to each of the television receivers;
transmitting a television signal including the attribute information of the accessible link destinations from the television receivers by using a television broadcasting system;
receiving the access history transmitted by each of the television receivers; and
obtaining the number of accesses to the specific link destinations based on the access history received from each of the television receivers.

10. The method for counting the number of accesses according to claim 9, further comprising providing the number of accesses obtained to a specific link destination manager system.

11. The method for counting the number of accesses according to claim 9, further comprising providing the number of accesses obtained to the television broadcasting system.

12. The method for counting the number of accesses according to claim 9, wherein a specific link destination is an advertisement site.

* * * * *